(12) United States Patent
Feiguine et al.

(10) Patent No.: US 10,749,943 B1
(45) Date of Patent: Aug. 18, 2020

(54) DISCOVERY AND MAPPING OF CLOUD-BASED RESOURCES

(71) Applicant: ServiceNow, Inc., Santa Clara, CA (US)

(72) Inventors: Alexandra Feiguine, Sha'ar Efrayim (IL); Shiri Hameiri, Kfar Saba (IL); Robert Bitterfeld, Petach Tikva (IL); Asaf Garty, Sdei Hemed (IL); Bary Solomon, Petah Tikva (IL); Daniel Badyan, Tel Aviv (IL); Hail Tal, Kohav Yair (IL); Shay Herzog, Raanana (IL); Shimon Sant, Petah Tikva (IL); Boris Erblat, Tel Aviv (IL); Aviya Aron, Shafir (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/381,768

(22) Filed: Apr. 11, 2019

(51) Int. Cl.
| | |
|---|---|
| *H04L 29/08* | (2006.01) |
| *H04L 29/06* | (2006.01) |
| *H04L 12/24* | (2006.01) |
| *H04L 12/803* | (2013.01) |
| *G06F 9/50* | (2006.01) |

(52) U.S. Cl.
CPC .......... *H04L 67/101* (2013.01); *G06F 9/5077* (2013.01); *H04L 41/0816* (2013.01); *H04L 41/0853* (2013.01); *H04L 41/12* (2013.01); *H04L 41/22* (2013.01); *H04L 47/125* (2013.01); *H04L 67/1008* (2013.01); *H04L 67/16* (2013.01); *H04L 67/34* (2013.01); *H04L 67/40* (2013.01)

(58) Field of Classification Search
CPC ............... G06F 9/5077; H04L 41/0816; H04L 41/0853; H04L 41/12; H04L 41/22; H04L 47/125; H04L 67/1008; H04L 67/101; H04L 67/16; H04L 67/34; H04L 67/40
See application file for complete search history.

(56) References Cited

U.S. PATENT DOCUMENTS

| | | | |
|---|---|---|---|
| 5,978,594 | A | 11/1999 | Bonnell |
| 6,321,229 | B1 | 11/2001 | Goldman |

(Continued)

*Primary Examiner* — Jerry B Dennison
(74) *Attorney, Agent, or Firm* — Fletcher Yoder PC

(57) ABSTRACT

A system includes persistent storage and an application that obtains a service identifier associated with a managed network. The service identifier allows access to a remote computing system that provides computing resources on behalf of the managed network. The application also identifies a geographic region that contains the computing resources. The application additionally identifies, within the geographic region, virtual computing devices allocated to the managed network and attributes thereof. The application further identifies, based on the attributes, (i) load balancers configured to distribute network traffic among the virtual computing devices and (ii) storage volumes used by the virtual computing devices. The application yet further determines a mapping between the virtual computing devices, the load balancers, and the storage volumes to represent a service infrastructure of the remote computing system dedicated to the managed network and stores, in the persistent storage, the mapping as one or more configuration items.

20 Claims, 14 Drawing Sheets

(56) References Cited

U.S. PATENT DOCUMENTS

| | | | |
|---|---|---|---|
| 6,816,898 B1 | 11/2004 | Scarpelli | |
| 6,895,586 B1 | 5/2005 | Brasher | |
| 7,027,411 B1 | 4/2006 | Pulsipher | |
| 7,392,300 B2 * | 6/2008 | Anantharangachar | H04L 41/12 370/254 |
| 7,617,073 B2 * | 11/2009 | Trinon | G06F 11/008 702/183 |
| 7,877,783 B1 | 1/2011 | Cline | |
| 7,945,860 B2 | 5/2011 | Vambenepe | |
| 8,554,750 B2 | 10/2013 | Rangaranjan | |
| 2015/0288569 A1 * | 10/2015 | Agarwal | H04L 41/12 709/224 |
| 2018/0324054 A1 * | 11/2018 | Biran | H04L 41/22 |
| 2019/0104024 A1 * | 4/2019 | Biran | H04L 41/5032 |
| 2019/0266502 A1 * | 8/2019 | Moser | G06N 5/04 |

* cited by examiner

DISCOVERY AND MAPPING OF CLOUD-BASED RESOURCES

BACKGROUND

Computing devices, software applications, storage structures, and other computing resources that make up a computer network may be discovered and the relationships therebetween may be mapped. These elements of the computer network, as well as the relationships, may be stored as configuration items in a database. The stored configuration items may later be retrieved and used to generate a visualization of a state or arrangement of these elements within the computer network. Discovering computing resource involves developing software processes that are capable of gathering the information needed for detection, classification, and/or identification of these computing resources.

SUMMARY

A remote computing system may be configured to provide computing resources on behalf of a managed computer network. These computing resources may include virtual computing devices, load balancers, and storage volumes distributed across one or more availability zones (e.g., datacenters) disposed within one or more geographic regions. These and other computing resources may collectively define a cloud-based computing environment that the managed network can use to host software applications, store and serve data, and provide other web-based software services.

A discovery application may be configured to discover and map the computing resources that make up the service infrastructure by way of which the cloud-based computing environment is provided. The discovery application may be configured to obtain attributes of the computing resources in different regions and availability zones by way of application programming interfaces (APIs) provided by the remote computing system. Based on the attributes, the discovery application may be configured to generate relationships among the computing resources and represent these relationships in a map. The map may indicate, for example, a distribution of virtual computing devices across one or more availability zones, storage volumes utilized by the virtual computing devices, load balancers configured to distribute traffic among the virtual computing devices, attributes of physical computing hardware by which the different resources are executed, and/or operating system images utilized by the virtual computing devices, among other aspects.

In some cases, the managed network may utilize multiple different remote computing systems, in addition to any on-premises computing devices, to provide its services. These different remote computing systems may vary in their names for certain computing resources and/or how these computing resources relate to one another, among other possibilities. For example, the different remote computing systems may refer to a datacenter as an "availability zone," as a "geographic sub-region," or simply a "datacenter."

However, the discovery application may be configured to utilize a common model (or at least a model derived from the common model) to represent aspects of each of these different remote computing systems. Namely, the discovery application may map each computing resource of multiple different remote computing systems to corresponding elements of the common model. Thus, a "datacenter" provided by a first remote computing system may be mapped to the same model component as an "availability zone" provided by another remote computing system. Similarly, the attributes available for each computing resource may be indicated by the model component, regardless of any differences between the specific set of attributes exposed by the remote computing system. Accordingly, multiple different remote computing systems may be mapped and visualized using the common model such that the computing resources thereof can be easily compared across systems.

The discovery application may additionally be used to manage, modify, adjust, and otherwise change the allocated computing resources. Namely, the discovery application may be used to provision additional computing resources, delete or dispose of computing resources, and/or otherwise modify the attributes and/or relationships of the computing resources. The discovery application may be configured to obtain instructions that define a target modification, generate a request to implement such a modification, and transmit this request to the remote computing system. Accordingly, modification may be made to the infrastructure provided by a particular remote computing system by way of the discovery application and without direct interaction with the interfaces provided by the remote computing systems.

Additionally, the discovery application may also be used to verify that an actual modification carried out by the remote computing system matches the target modification. To that end, the discovery application may utilize a subset of the discovery and mapping operations to obtain attributes of the modified computing resource after the modification has been confirmed by the remote computing system. The discovery application may obtain such attributes and, based thereon, determine whether the actual modification matches the target modification. If so, the discovery application may update the mapping to maintain consistency between the mapping and the actual state of the remote computing system infrastructure.

Otherwise, the discovery application may be configured to undo or roll back the modification. Alternatively or additionally, the discovery application may be configured to execute a revised modification using a modified request so as to reach the target modification. The target modification to the infrastructure may be user-specified, specified by the discovery application, or specified by another software application that utilizes the computing resources of the remote computing system. Similarly, the match between the target modification and the actual modification may be evaluated by a user, by the discovery application, and/or the other application.

In either case, the discovery and mapping process may be used to facilitate modifications to the computing resources of the remote computing system. For example, users unfamiliar with managing the remote computing system may nevertheless use a graphical representation of the mapping (rather than, e.g., a command line interface that uses system-specific syntax) to intuitively make modifications to the remote computing system by interacting with the graphic representation. Similarly, by confirming the modifications through the discovery process, the discovery application provides visual feedback of any modifications requested by the users. Thus, users may be easily able to undo and correct any undesired or erroneous modifications.

Accordingly, a first example embodiment may involve a computing system that includes persistent storage configured to store data on behalf of a managed network. A remote computing system provides computing resources on behalf of the managed network. The computing system also includes a discovery application configured to perform operations. The operations include obtaining a service identifier that allows access to the remote computing system. The service identifier is associated with the managed network. The operations also include identifying a geographic region of the remote computing system that contains the computing resources associated with the service identifier. The operations additionally include identifying, within the geographic region, (i) virtual computing devices allocated to the managed network and (ii) attributes of the virtual computing devices. The operations further include identifying, based on the attributes of the virtual computing devices, (i) one or more load balancers configured to distribute network traffic among the virtual computing devices and (ii) one or more storage volumes used by the virtual computing devices. The operations yet further include determining a mapping between the virtual computing devices, the one or more load balancers, and the one or more storage volumes to represent a service infrastructure of the remote computing system dedicated to the managed network. The operations yet additionally include storing, in the persistent storage, the mapping as one or more configuration items.

A second example embodiment may involve obtaining, by a discovery application, a service identifier associated with a managed network that allows access to a remote computing system that provides computing resources on behalf of the managed network. The second example embodiment may also involve identifying, by the discovery application, a geographic region of the remote computing system that contains the computing resources associated with the service identifier. The second example embodiment may additionally involve identifying, by the discovery application and within the geographic region, (i) virtual computing devices allocated to the managed network and (ii) attributes of the virtual computing devices. The second example embodiment may further involve identifying, by the discovery application and based on the attributes of the virtual computing devices, (i) one or more load balancers configured to distribute network traffic among the virtual computing devices and (ii) one or more storage volumes used by the virtual computing devices. The second example embodiment may yet further involve determining, by the discovery application, a mapping between the virtual computing devices, the one or more load balancers, and the one or more storage volumes to represent a service infrastructure of the remote computing system dedicated to the managed network. The second example embodiment may yet additionally involve storing, in persistent storage configured to store data on behalf of the managed network, the mapping as one or more configuration items.

In a third example embodiment, an article of manufacture may include a non-transitory computer-readable medium, having stored thereon program instructions that, upon execution by a computing system, cause the computing system to perform operations in accordance with the first example embodiment or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment or the second example embodiment.

In a fifth example embodiment, a system may include various means for carrying out each of the operations of the first example embodiment or the second example embodiment.

A sixth example embodiment may involve a computing system that includes persistent storage configured to store, as one or more configuration items and on behalf of a managed network, a mapping of computing resources provided by a remote computing system to the managed network. The mapping represents a service infrastructure of the remote computing system dedicated to the managed network. The computing system also includes a discovery application configured to perform operations. The operations include obtaining instructions to modify a computing resource provided by the remote computing system and, based on the instructions, generating and transmitting, to the remote computing system, a request to modify the computing resource. The operations also include receiving, from the remote computing system, a response indicating a modification to the computing resource. The operations additionally include selecting a discovery pattern configured to verify the modification to the computing resource by obtaining attributes associated therewith and obtaining, from the remote computing system, the attributes associated with the computing resource by executing the discovery pattern. The operations further include determining, based on the attributes associated with the computing resource, that the modification to the computing resource has been completed according to the instructions. The operations yet further include, based on the modification to the computing resource having been completed according to the instructions, updating the mapping to indicate the modification and storing, in the persistent storage, the mapping as updated.

A seventh example embodiment may involve obtaining, by a discovery application, instructions to modify a computing resource of computing resources provided by a remote computing system to a managed network. A mapping of the computing resources is stored as one or more configuration items in persistent storage on behalf of the managed network. The mapping represents a service infrastructure of the remote computing system dedicated to the managed network. The seventh example embodiment may also involve, based on the instructions, generating and transmitting, by the discovery application and to the remote computing system, a request to modify the computing resource. The seventh example embodiment may additionally involve receiving, by the discovery application and from the remote computing system, a response indicating a modification to the computing resource. The seventh example embodiment may further involve selecting, by the discovery application, a discovery pattern configured to verify the modification to the computing resource by obtaining attributes associated therewith and obtaining, by the discovery application and from the remote computing system, the attributes associated with the computing resource by executing the discovery pattern. The seventh example embodiment may yet additionally involve determining, by the discovery application and based on the attributes associated with the computing resource, that the modification to the computing resource has been completed according to the instructions. The seventh example embodiment may yet further involve, based on the modification to the computing resource having been completed according to the instructions, updating, by the discovery application, the mapping to indicate the modification and storing, in the persistent storage, the mapping as updated.

In an eighth example embodiment, an article of manufacture may include a non-transitory computer-readable medium, having stored thereon program instructions that, upon execution by a computing system, cause the computing system to perform operations in accordance with the sixth example embodiment or the seventh example embodiment.

In a ninth example embodiment, a computing system may include at least one processor, as well as memory and program instructions. The program instructions may be stored in the memory, and upon execution by the at least one processor, cause the computing system to perform operations in accordance with the sixth example embodiment or the seventh example embodiment.

In a tenth example embodiment, a system may include various means for carrying out each of the operations of the sixth example embodiment or the seventh example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
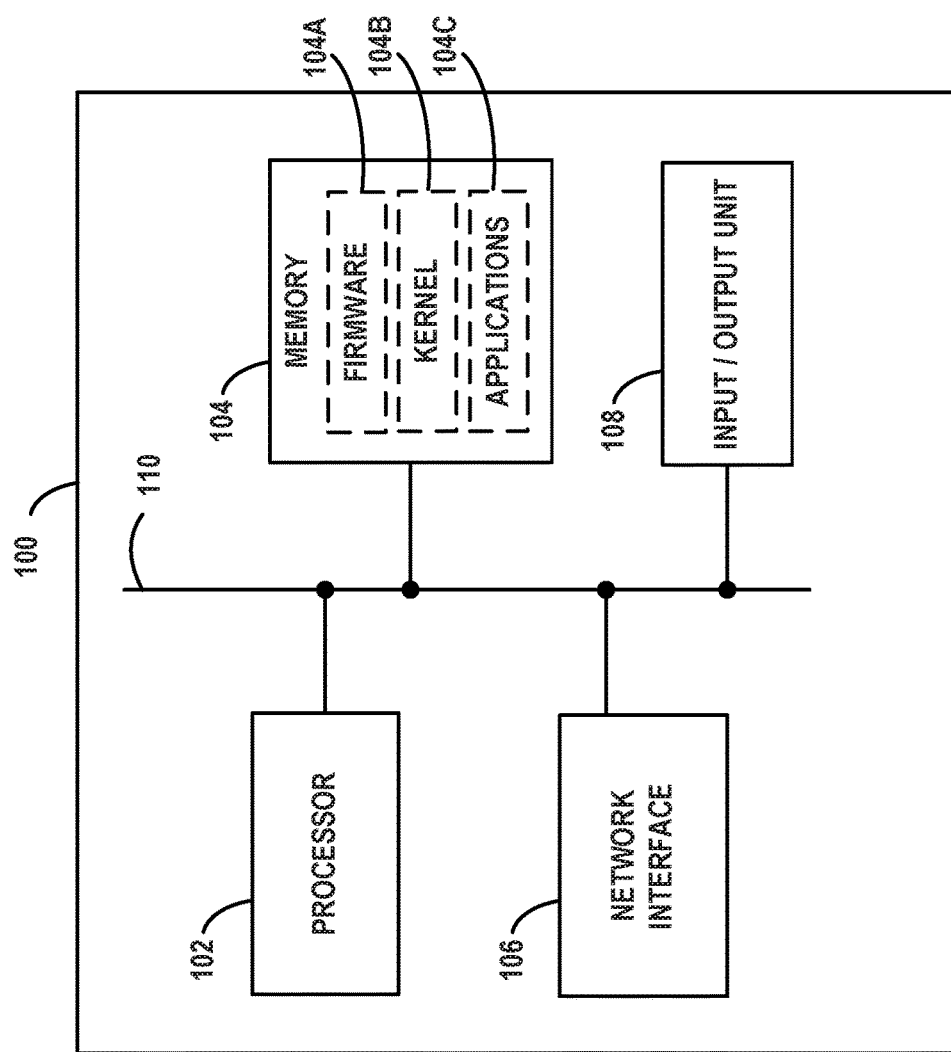
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/ output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
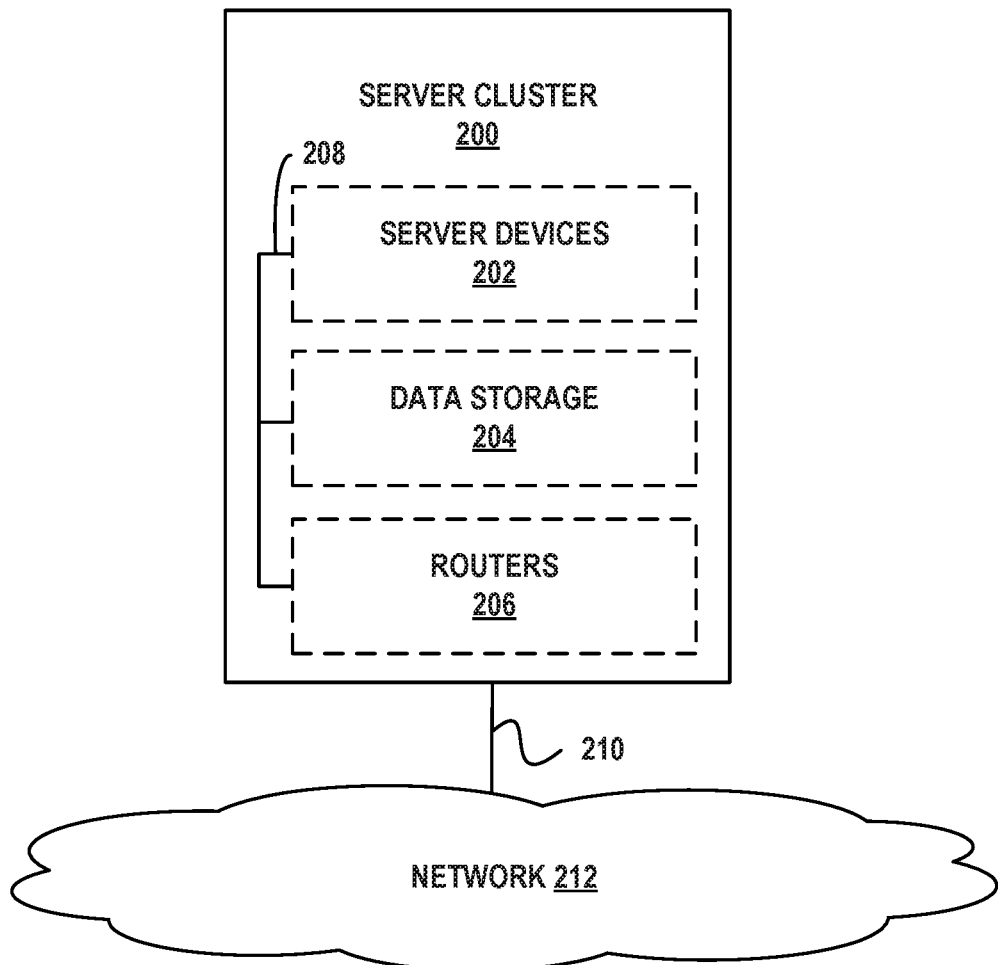
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
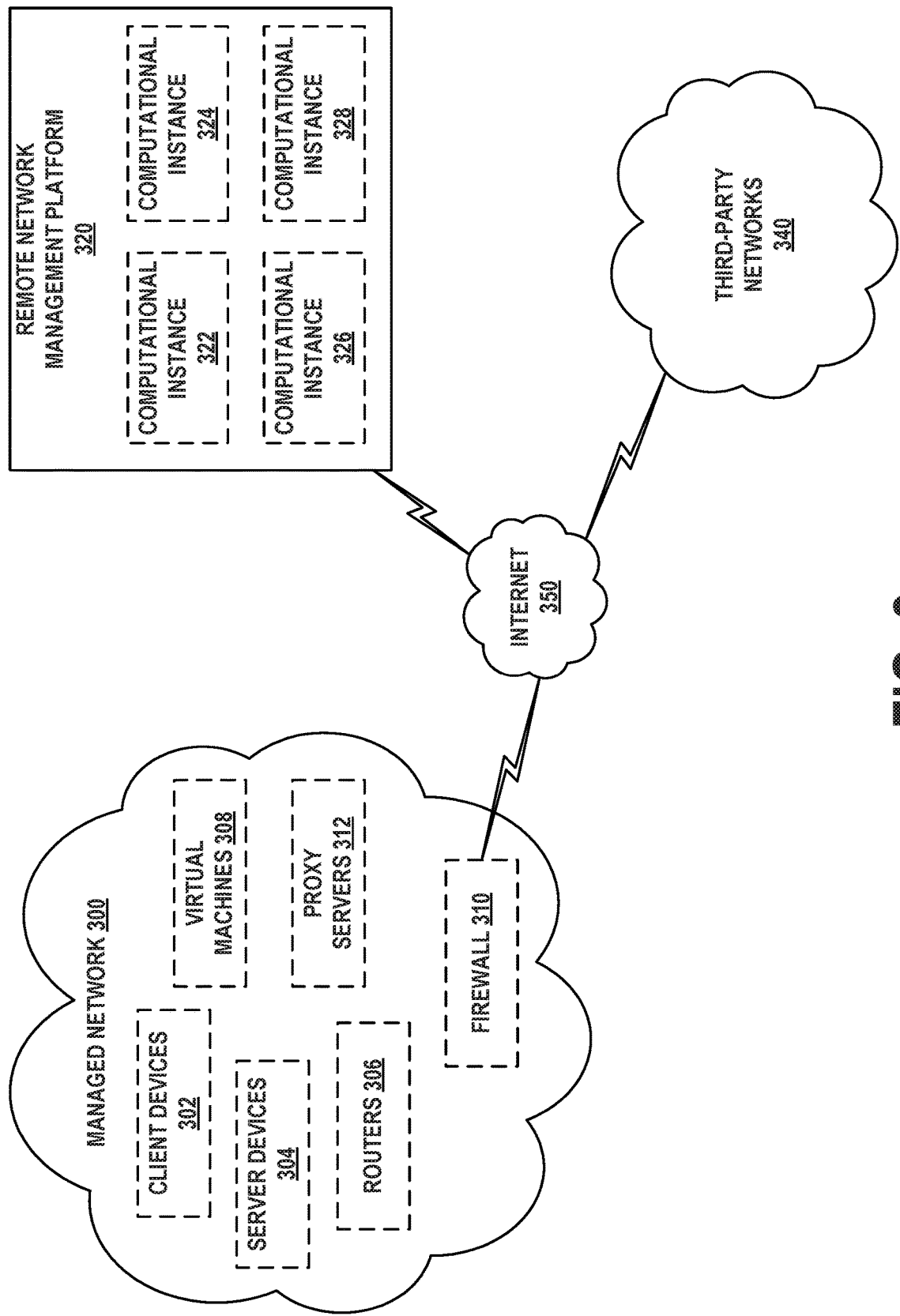
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
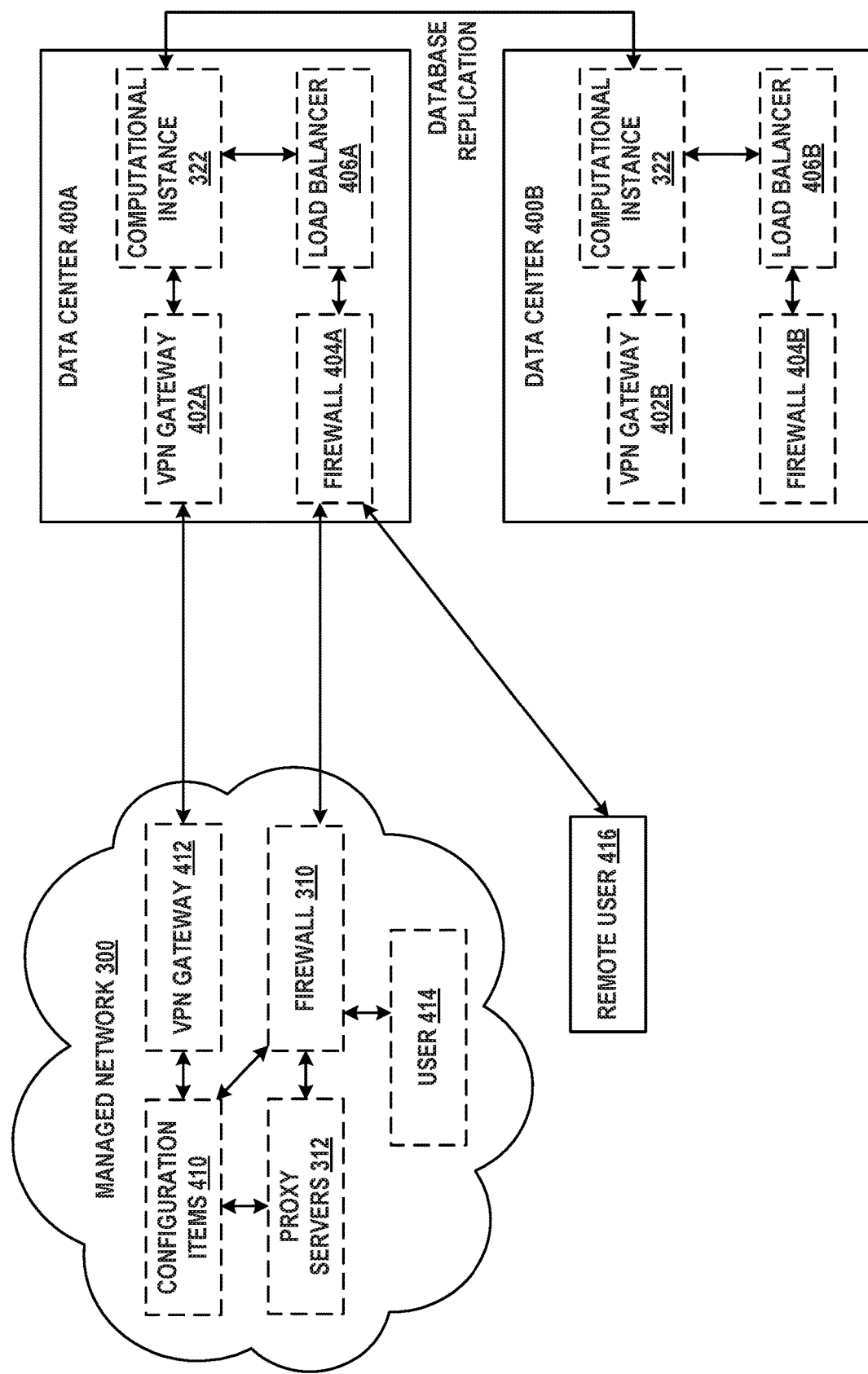
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
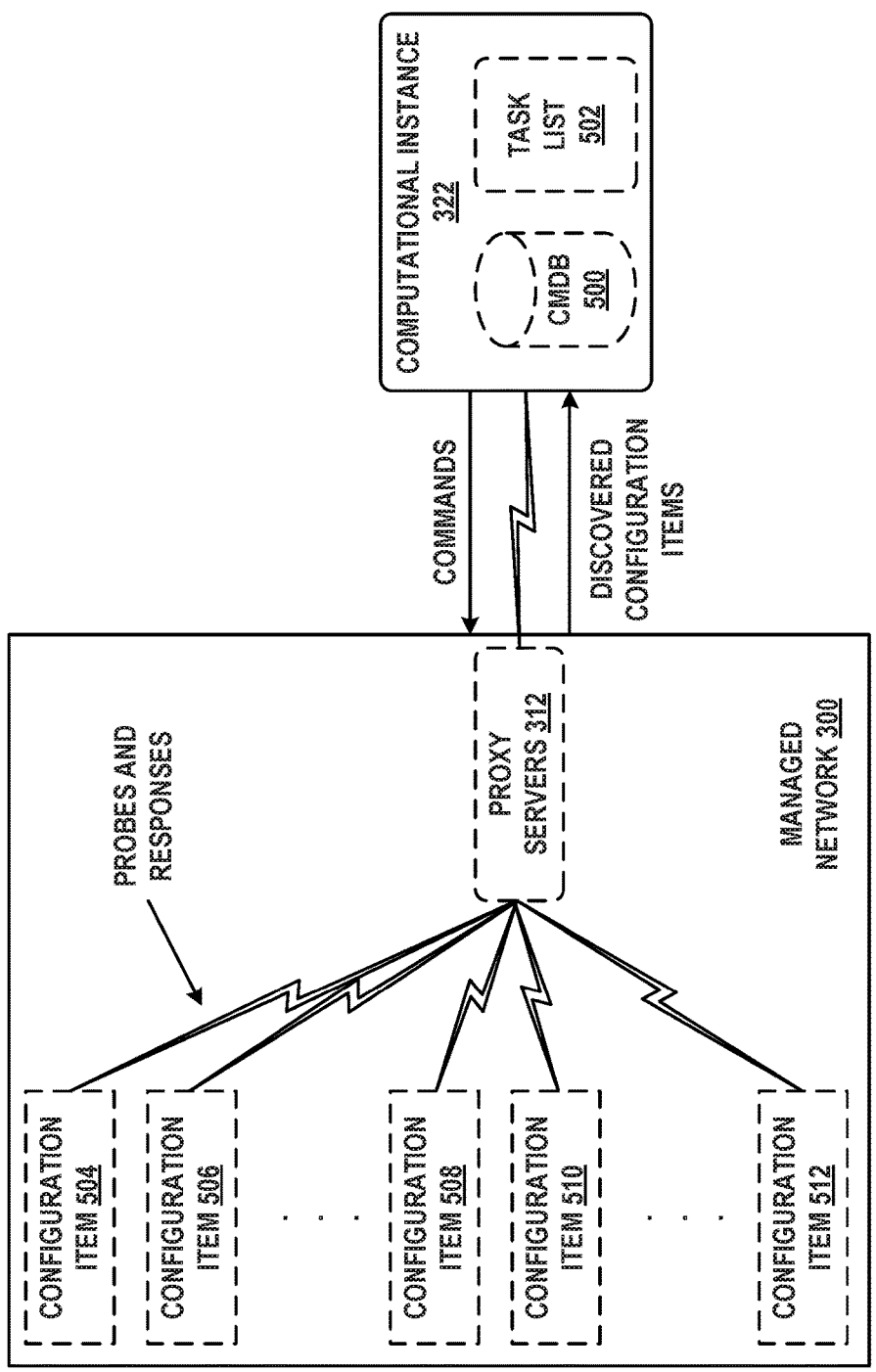
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
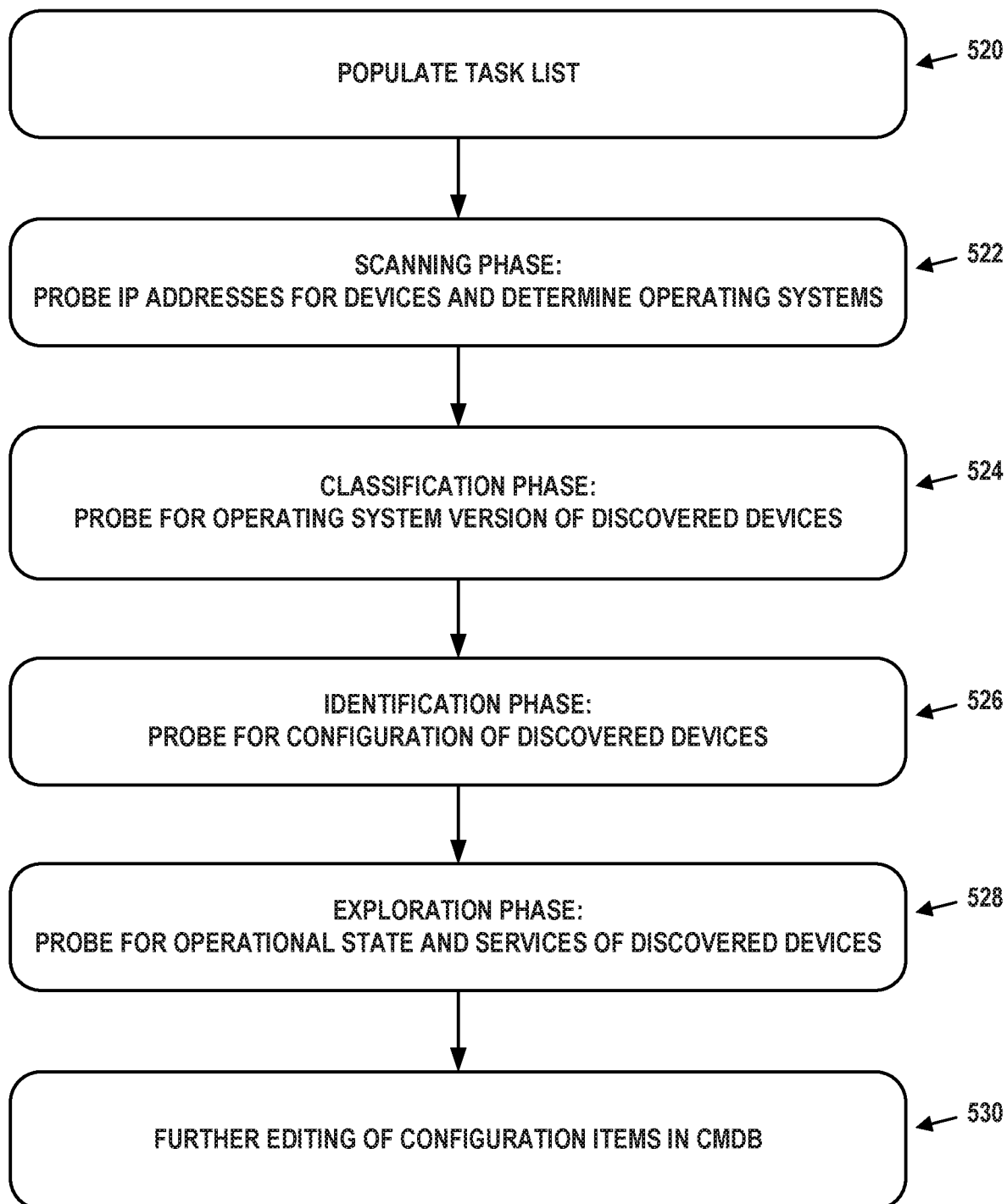
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Remote Computing System Architecture

Figure 6:
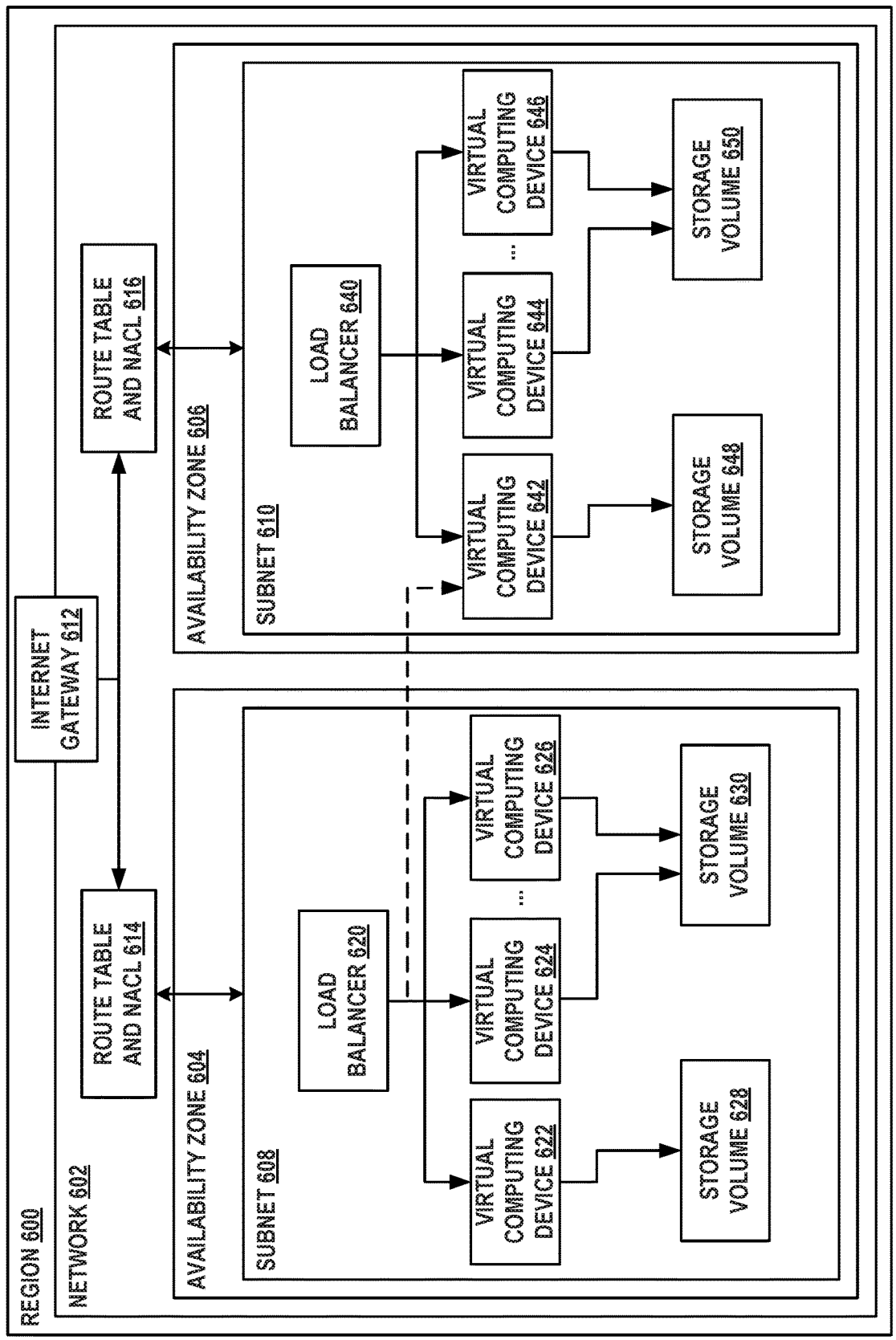
FIG. 6 illustrates a remote computing system architecture, in accordance with example embodiments.

FIG. 6 illustrates an example architecture of a remote computing system. The remote computing system may provide a cloud-based computing environment that allows managed network 300 to host software applications, store data, and otherwise utilize remotely-hosted computing resources. The cloud-based computing environment may be provided atop an infrastructure of various computing resources that allow the computing environment to be defined, modified, and otherwise tailored to the needs of managed network 300. The remote computing system may be GOOGLE CLOUD PLATFORM®, IBM CLOUD®, MICROSOFT® AZURE®, and/or AMAZON WEB SERVICES®, among other possible cloud providers.

The cloud-based computing environment may be configured to automatically scale as demand for the computing resources vary over time. Accordingly, the state of the infrastructure of computing resources may also fluctuate over time to allow for such scaling. The extent of scaling and fluctuation in the computing resources dedicated to managed network 300 may indicate a popularity (e.g., absolute popularity and/or relative popularity) of the services provided by managed network 300. This may result in variable costs of using the cloud-based computing environment. Thus, maintaining an accurate and up-to-date map of the service infrastructure dedicated by the remote computing system to managed network 300 may allow managed network 300 to more effectively and/or efficiently utilize the cloud-based computing environment. To that end, managed network 300 may utilize a discovery application to discover and map the service infrastructure, and subsequently modify aspects thereof to reach a target state.

The computing infrastructure provided by the remote computing system may be organized into multiple different geographic regions. Each geographic region may encompass a geographic area in which multiple different and physically separate data centers are located. For example, the regions may include United States South (i.e., US-South), US-East, European Union Great Britain (i.e., EU-GB), EU-Germany, and Asia Pacific North (i.e., AP-North), among other possibilities. Different remote computing systems may implement a different set of regions. Allocating computing resources within a particular geographic region allows client devices within or nearby this region to more quickly communicate with the computing resources therein.

Region 600 is an example region of the remote computing system. Although not shown, the remote computing system may include multiple geographically-distributed instantiations of region 600 and one or more of its components. Managed network 300 may be assigned a plurality of computing resources within region 600 that make up at least part of the cloud-based computing environment. Namely, region 600 includes availability zone 604 and availability zone 606, each of which may represent a corresponding physical data center. In some implementations, the underlying hardware that makes up each of availability zones 604 and 606 may be physically isolated, such that outages (e.g., power outages) associated with one availability zone do not affect the other availability zone. Accordingly, availability zones may provide redundancy within a single geographic region.

Each of availability zones 604 and 606 may be part of network 602 dedicated to managed network 300 by the remote computing system. Network 602 may allow client devices (e.g., computing devices external to the remote computing system) access to computing resources in availability zones 604 and/or 606 and may also allow these computing resources to communicate with one another. In some embodiments, network 602 may be referred to as a Virtual Private Cloud (VPC). Each availability zones may be assigned a corresponding subnet, thus allowing for a logical division (e.g., based on IP address) of the computing resources provided by each availability zone. That is, availability zone 604 may be assigned subnet 608 while availability zone 606 may be assigned subnet 610.

Network 602 also includes Internet gateway 612, route table and network access control list (NACL) 614 for subnet 608, and route table and NACL 616 for subnet 610. Internet gateway 612 may provide an interface between components of network 602 and the Internet (e.g., computing devices outside of network 602). Route tables and NACLs 614 and 616 may provide network traffic control to subnets 608 and 610, respectively. Among other network parameters, route table and NACL 614 may define permitted destinations for and permitted types of traffic originating out of computing resources in subnet 608, as well as permitted sources and permitted types of traffic addressed to computing resources in subnet 608. For example, route table and NACL 614 may indicate whether subnet 608 is accessible to computing devices outside of network 602 (i.e., whether subnet 608 is public or private). Route table and NACL 616 may define similar rules for subnet 610.

Internet gateway 612, as well as route tables and NACLs 614 and 616, may represent logical components of the remote computing system. That is Internet gateway 612, route table and NACL 614, and/or route table and NACL 616 may be implemented by one or more physical devices (e.g., gateways and routers) of the remote computing system. Additionally, in some implementations of a remote computing system, network 602 may extend across, cover, or include multiple different instantiations of region 600.

Each availability zone may include therein a corresponding plurality of computing resources. Namely, availability zone 604 (and subnet 608) may include therein load balancer 620, virtual computing devices 622 and 624 through 626 (i.e., virtual computing devices 622-626), and storage volumes 628 and 630. Similarly, availability zone 606 (and subnet 610) may include therein load balancer 640, virtual computing devices 642 and 644 through 646 (i.e., virtual computing devices 642-646), and storage volumes 648 and 650. A virtual computing device may alternatively be referred to as a virtual machine.

In some implementations, each of load balancers 620 and 640, virtual computing devices 622-626 and 642-646, and storage volumes 628, 630, 648, and 650 may represent physical computing resources of the remote computing system. For example, virtual computing device 622 may represent a physical computing device used exclusively for computation, but not other tasks such as providing storage or load balancing. Alternatively, each of these computing resources may represent virtual computing resources (e.g., software processes that isolate the implementation of the computing resource from the underlying physical hardware). Thus, for example, each physical computing device within the remote computing system may execute and provide multiple virtual computing resources, including computation, load balancing, and storage.

Load balancer 640 may be configured to distribute network traffic (e.g., web traffic generated by various software applications) or other types of requests among virtual computing devices 642-646. Thus, load balancer 640 may balance traffic within a single availability zone. On the other hand, load balancer 620 may be configured to distribute network traffic among virtual computing devices 622-626 and 642. Thus, load balancer 620 may be configured to balance traffic across multiple availability zones. When load balancers 620 and/or 640 are accessible by computing devices outside of network 602 (or one or more other networks in other geographic regions of the remote computing system), they may be considered public load balancers. On the other hand, when load balancers 620 and/or 640 are accessible only by computing resources within network 602, they may be considered private load balancers.

Virtual computing devices 622-626 and 642-646 may each be configurable to provide a target amount of computing resources. For example, the number of processor cores dedicated to execution of each virtual computing device, the amount of memory available to each virtual computing device, and the operating system executed by each virtual computing device may be adjustable for each of virtual computing devices 622-626 and 642-646. Virtual computing devices 622-626 and 642-646 may utilize storage volumes 628, 630, 648, and 650 to store various data associated with the software executed by these virtual computing devices. Specifically, virtual computing device 622 may utilize storage volume 628, virtual computing device 624 and 626 may utilize storage volume 630, virtual computing devices 642 may utilize storage volume 648, and virtual computing devices 644 and 646 may utilize storage volume 650.

These and other aspects of the remote computing system may be discoverable, mappable, and modifiable by the discovery application. Specifically, the discovery application may utilize an API, a command line interface, or another mechanism provided by the remote computing system to determine and adjust the service infrastructure dedicated to managed network 300 by the remote computing system. Specifically, the discovery application may obtain attributes of the various computing resources provided by the remote computing system and, based on the attributes, determine how these different computing resources coordinate with one another. The computing resources, their attributes, and the relationships therebetween may be represented as a map to allow for a visualization of the service infrastructure. The map may, in turn, be used to identify modifications and adjustments to a current state of the infrastructure that allow a target infrastructure state to be reached.

VII. Example CMDB Model of a Remote Computing System

Figure 7:
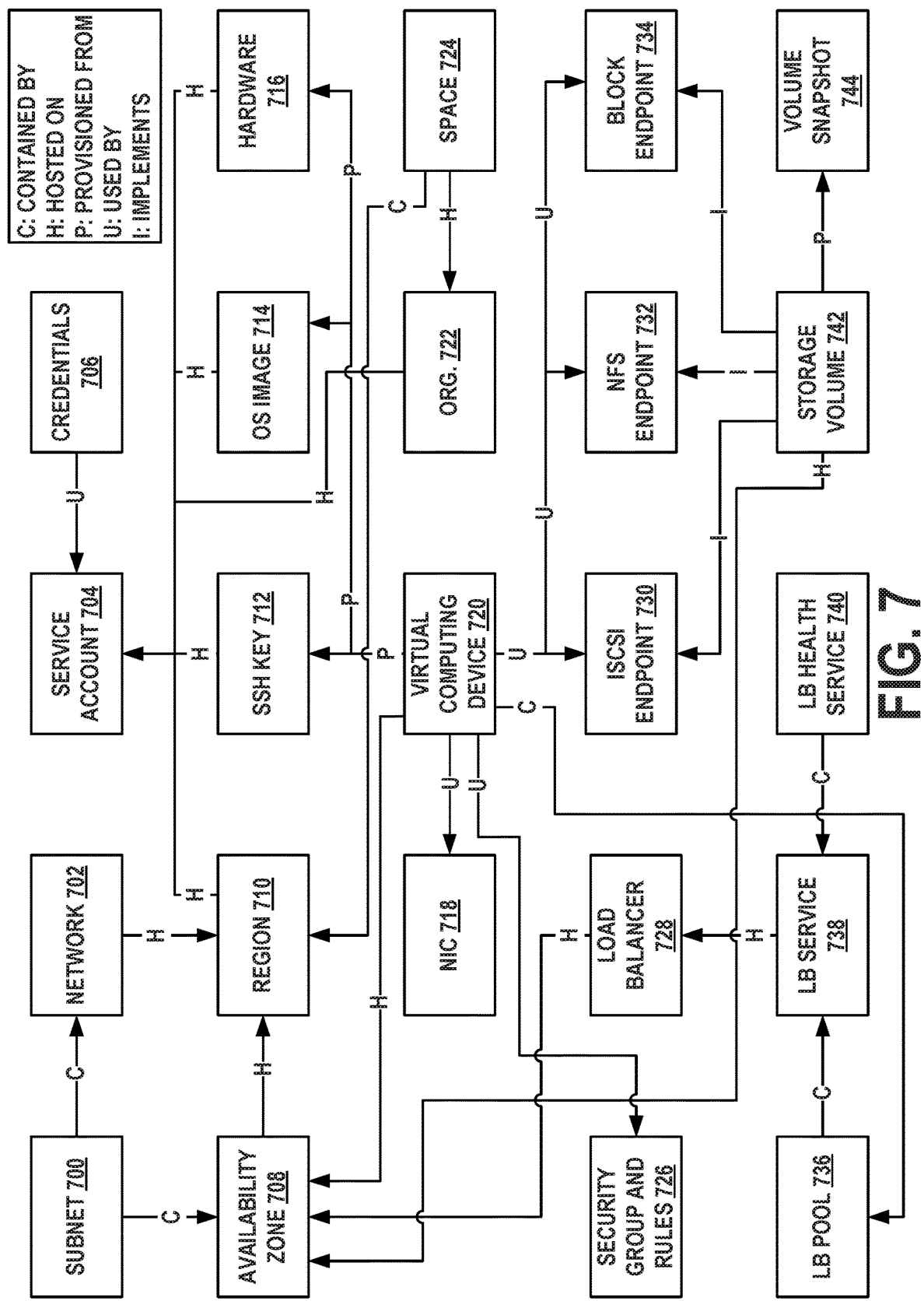
FIG. 7 illustrates a configuration management database model, in accordance with example embodiments.

FIG. 7 illustrates an example model according to which a mapping of computing resources of a remote computing system may be determined and stored in a CMDB. The discovery application may utilize this model to discover, map, and modify the computing resources of the remote computing system. In some cases, different remote computing system providers may use different names to refer to certain computing resources within this model. The discovery application may be configured to identify a correspondence between portions of the model in FIG. 7 and the computing resource names used by a particular provider, thus allowing many different remote computing systems to be mapped according to this model. Additionally or alternatively, when some remote computing systems deviate from the model in other ways, the discovery application may be configured to account for such variations by modifying this model to accurately reflect the infrastructure of these remote computing systems.

The model of FIG. 7 illustrates the different types of computing resources found in a remote computing system, as well as how these different computing resources relate to one another. Notably, the model includes one box per type of computing resource. However, a map of the computing resources determined based on the model may include multiple instantiations of each of the boxes making up the model. Thus, the map may reflect an actual state of the infrastructure and may be determined based on resource types and the relationships therebetween illustrated in the model.

Discovery may be initiated by specifying, by way of the discovery application, service account 704 and credentials 706 therefor. As indicated by the model key in the upper right corner of FIG. 7, credentials 706 are used by service account 704. Service account 704 and credentials 706 may collectively be referred to as a service identifier since they allow the discovery application to access, on behalf of managed network 300, the specific portions of the remote computing system that are dedicated to managed network 300, thus enabling the discovery process. Credentials 706 may take the form of a username and password or a web token (e.g., a JavaScript Object Notation (JSON) Web Token), among other possibilities.

Service account 704 may identify region 710 in which computing resources are dedicated to managed network 300 by the remote computing system. As indicated by the model key, region 710 may be considered to be hosted on service account 704. Similarly, network 702 and availability zone 708 are hosted on region 710. Notably, this relationship is also illustrated in FIG. 6 in that region 600 contains therein network 602 and availability zones 604 and 606. In some implementations, availability zone 708 may also be contained by network 702 (e.g., as shown in FIG. 6), although this relationship is not shown in FIG. 7.

Network 702 may define a state of the network (e.g., active vs. inactive), a Classless Inter-Domain Routing (CIDR) block of addresses used by network 702, a virtual local area network (VLAN) number, and devices that make up the network, among other possible attributes. Both network 702 and availability zone 708 contain subnet 700. Subnet 700 may define a unique name of the subnet, a subnet mask, a CIDR block of addresses assigned to the subnet, a number of IP addresses available on the subnet, and a gateway used by the subnet, among other attributes thereof.

Since network 702 and availability zone 708 are hosted on region 710 and region 710 is, in turn, hosted on service account 704, network 702 and availability zone 708 may also be considered to be hosted on service account 704. Thus, in general, for "hosted on" and "contained by" relationships, a child node (i.e., a box having an "H" or "C" arrow extending therefrom) may also inherit the relationships held by its parent node (i.e., a box having an "H" or "C" arrow extending thereto). Thus, subnet 700 may be hosted on region 710 and service account 704.

Availability zone 708 may host virtual computing device 720, storage volume 742, and load balancer 728. Virtual computing device 720 may use network interface controller (NIC) 718 to communicate with other computing resources in network 702. Virtual computing device 720 may also use security group and rules 726, which effectively provide a firewall for virtual computing device 720. In some embodiments, each of NIC 718 and security group and rules 726 may have a "contained by" relationship with network 702 (not shown).

Virtual computing device 720 may be provisioned from secure shell (SSH) key 712, operating system (OS) image 714, and hardware 716, each of which may also be hosted on service account 704. SSH key 712 may define one or more SSH keys used by virtual computing device 720 to authenticate itself to other computing resources, including computing resources in and outside of the remote computing system. OS image 714 may define, among other attributes, the type (e.g., WINDOWS®, LINUX®, etc.) and release version (e.g., WINDOWS® 10) of the operating system executed by virtual computing device 720. Hardware 716 may define the attributes of the underlying physical hardware on which virtual computing device 720 is executing. For example, hardware 716 may define the processor provider (e.g., INTEL®, AMD®), processor model, processor specifications, and available memory, among other attributes thereof.

Load balancer 728 may host thereon load balancer (LB) service 738 that contains LB health service 740 and LB pool 736. Each load balancer 728 may provide multiple LB services 738 each corresponding to a different software application. LB pool 736 may define one or more of virtual computing devices 720 among which LB service 738 distributes network traffic. Accordingly, virtual computing device 720 is shown as having a "contained by" relationship with LB pool 736. LB health service 740 may indicate how an operational status of LB service 738 is monitored, indicating, for example, how frequently LB service 738 is pinged to verify that it is running (e.g., every five seconds), a maximum timeout period of time after a ping within which a response to the ping is expected, and a maximum number of failed pings before LB service 738 is terminated and replaced, among other attributes.

Storage volume 742 may implement each of internet small computer system interface (ISCSI) endpoint 730, network file system (NFS) endpoint 732, and block endpoint 734. That is, storage volume 742 may provide a plurality of different interfaces (e.g., each implementing a different protocol) by way of which virtual computing device 720 can access and use storage volume 742, as indicated by the corresponding arrows and their relationships. Storage volume 742 may be provisioned from volume snapshot 744, which may define snapshot name, a size of the storage volume represented thereby, and a source storage volume from which the snapshot was taken, among other attributes.

The remote computing system may additionally allow managed network to divide the computing resources dedicated thereto into organizations (org.) 722 and spaces 724. Organizations 722 may be hosted on service account 704, and the computing resources that make up an organization may be distributed between multiple regions 710. Different organizations 722 may allow managed network 300 to, for example, separately maintain the computing resources dedicated to different departments within managed network 300. Spaces 724, which are hosted by respective organizations 722, may each be contained within a corresponding region 710. Spaces 724 may allow managed network 300 to create multiple different isolated computing environments within an organization. For example, in the course of development of its software applications, a particular department within managed network 300 may utilize a development environment, a staging environment, and a production environment, each of which may be created by a separate space.

Notably, as suggested above, each respective computing resource of computing resources 700-744 shown in FIG. 7 may be associated with at least a unique identifier and one or more attributes of the respective computing resource. In some implementations, the specific attributes provided or exposed by a particular remote computing system for the respective computing resource may vary. For example, for a particular computing resource, a first remote computing system may provide a first set of attributes while a second remote computing system provides a second different set of attributes. The model may support this difference by including, for the particular computing resource, fields for both the first and second sets of attributes. Thus, depending on the specific remote computing system undergoing discovery, different portions of the model may be utilized to generate the map of the service infrastructure. Alternatively, in some cases, each remote computing system may be associated with a corresponding variation of the model of FIG. 7 that includes computing resource types and attribute fields specific to those provided by the particular remote computing system.

VIII. Example Mapping and Discovery of Remote Computing System

Figure 8:
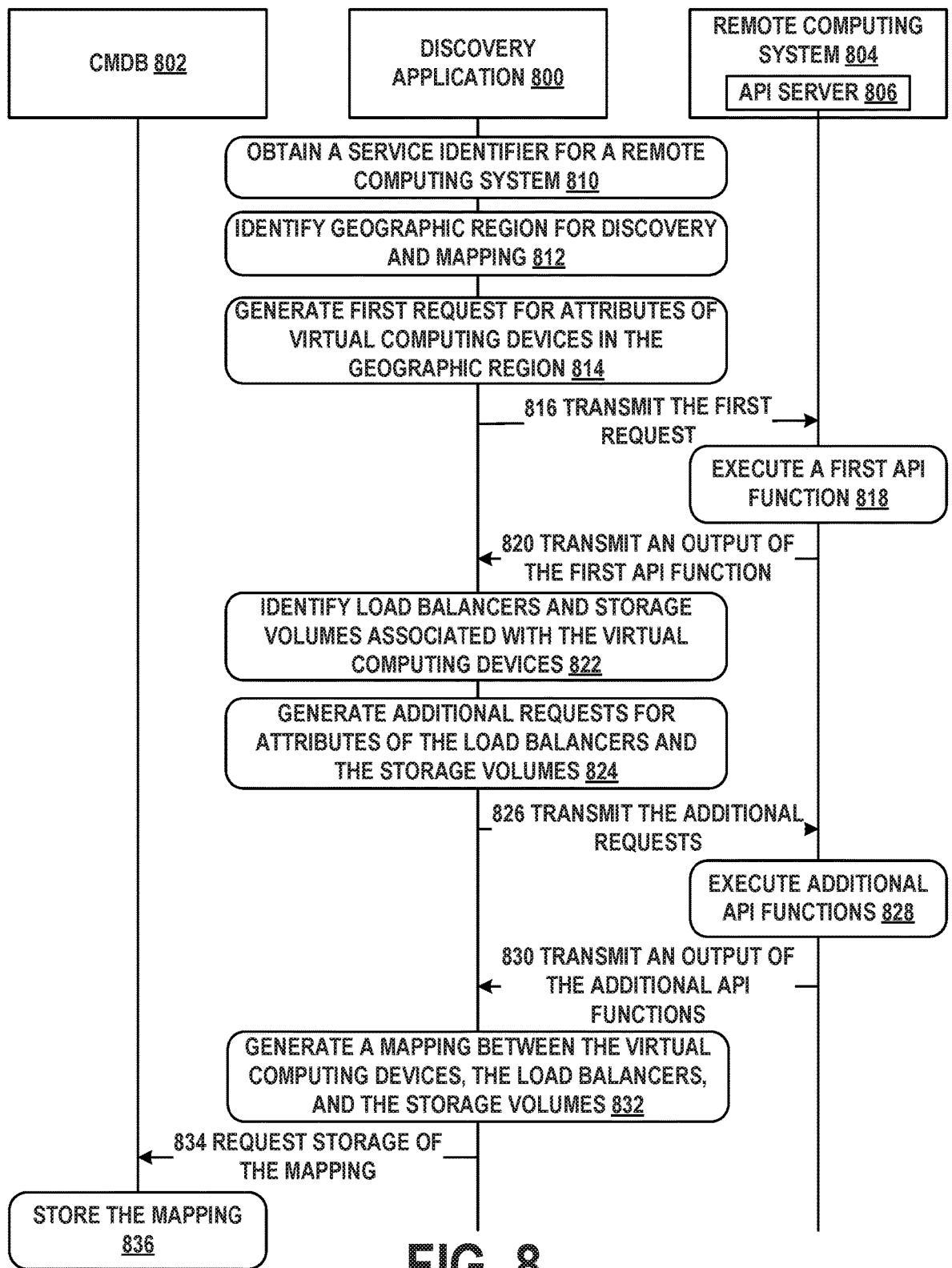
FIG. 8 is a message diagram, in accordance with example embodiments.

FIG. 8 illustrates message diagram of operations involved in discovering and mapping aspects of a remote computing system. Execution of these and other operations may allow discovery application 800 to determine, according to the model shown in FIG. 7 or a variation thereof, a map of the computing resources provided by remote computing system 804 to managed network 300. A representation of this map may be stored in CMDB 802 as one or more configuration items.

Discovery application 800 and CMDB 802 may be hosted by managed network 300, by remote network management platform 320, or distributed therebetween. CMDB 802 may be stored in persistent storage as one or more data structures (e.g., database tables). Remote computing system 804 may provide API server 806 configured to execute a plurality of functions. These functions may be remotely accessible by discovery application 800, and may be configured to generate data indicative of computing resources allocated to managed network 300. Namely, by invoking functions provided by API server 806, discovery application 800 may obtain the information necessary to determine the map of these computing resources.

Discovery application 800 may be configured to obtain a service identifier for remote computing system 804, as indicated by block 810. This service identifier may correspond to service account 704 and/or credentials 706. Accordingly, the service identifier may allow discovery application 800 to access, discover, and/or determine the attributes of computing resources dedicated to managed network 300 by remote computing system 804. The service identifier may thus, at least in part, define the scope of discovery carried out by discovery application 800.

Based on or in response to obtaining the service identifier at block 810, discovery application 800 may be configured to identify a geographic region for discovery and mapping, as indicated by block 812. The computing resources dedicated to managed network 300 by remote computing system 804 may be distributed among multiple different geographic regions. In some cases, each region may provide a different API or a different API function for obtaining information on the computing resources located within that region. Alternatively or additionally, the API may necessitate that discovery application 800 specify a particular region as an input parameter of the API function. Thus, identifying the geographic regions that are to be discovered and mapped may allow discovery application 800 to utilize the correct APIs and API functions in subsequent operations.

In some implementations, the different geographic regions utilized by managed network 300 may be indicated by the service identifier. Alternatively, discovery application 800 may transmit a query (e.g., a hypertext transfer protocol (HTTP) request) to remote computing system 804 (e.g., to API server 806) requesting identification of the different geographic regions in which computing resources are dedicated to managed network 300. In response to this query, remote computing system 804 may provide (e.g., as an HTTP response) a list of one or more regions that contain computing resources associated with the service identifier, thus allowing discovery application 800 to further define the scope of subsequent discovery operations.

Based on or in response to identifying the geographic region at block 812, discovery application 800 may be configured to generate a first request for attributes of virtual computing devices located in the geographic region, as indicated by block 814. As mentioned above, the request may specify the geographic region as an input parameter of the API function, by calling an API function specific to the geographic region, or by calling an API specific to the geographic region, among other possibilities.

When the first request is an HTTP request, the input parameters for the function may be provided as HTTP parameters, such as URL resource path parameters that identify specific resources provided by API server 806, URL query parameters that include key and value pairs, HTTP header parameters, HTTP cookie parameters, and/or HTTP body parameters. Additionally, the geographic region may be specified by way of the URL. For example, calling an API specific to the geographic region may involve transmitting the first request to REGION.REMOTE_SYSTEM.COM/API_FUNCTION, thus specifying the region as a subdomain of the "REMOTE_SYSTEM" domain. Similarly, calling an API function specific to the geographic region may involve transmitting the first request to REMOTE_SYSTEM.COM/REGION/API_FUNCTION, thus specifying the region as a resource path parameter. Further, specifying the region as an input parameter of the API function may involve transmitting the first request to REMOTE_SYSTEM.COM/API_FUNCTION®ION=SPECIFIC_REGION, thus indicating the region by assigning the query parameter value "SPECIFIC_REGION" to query parameter key "REGION."

The attributes of the virtual computing devices may include a name or other identifier (e.g., IP address) of the virtual computing device, identifiers of any storage volumes used by the virtual computing device, and/or identifiers of any other aspects of the model shown in FIG. 7 that have a relationship with the virtual computing device. Thus, the attributes may indicate other computing resources with which the virtual computing devices interact and/or which the virtual computing devices use in providing the computing environment. As such, the virtual computing devices may serve as a central point for discovery from which other computing resources dedicated to managed network 300 can be discovered and mapped. That is, since the virtual computing devices either use or are provisioned from many other computing resources within the model of FIG. 7, the attributes of the virtual computing devices facilitate generation of relationships once these other computing resources are discovered by subsequent discovery operations.

Based on or in response to generating the first request at block 814, discovery application 800 may be configured to transmit, to API server 806, the first request, as indicated by arrow 816. In some embodiments, the API of API server 806 may be accessible by way of a command line interface. Accordingly, transmitting the first request may involve discovery application 800 logging in to API server 806 and establishing therewith a remote shell connection. Discovery application 800 may then cause, by way of the remote shell connection, API server 806 to execute one or more operating system shell commands or scripts. In other embodiments, the API of API server 806 may be a representational state transfer (REST) API and may thus be accessible by way of HTTP requests. API server 806 may also be configured to provide, and discovery application 800 configured to utilize, other interfaces for accessing the functions of the API.

Based on or in response to reception of the request at arrow 816, API server 806 may be configured to execute a first API function addressed by the first request, as indicated by block 818. Execution of the first API function may generate an output indicating (i) an identifier of each respective virtual computing device dedicated to managed network 300 in the specified geographic region and (ii) for each respective virtual computing device, attributes associated with the respective virtual computing device. In some implementations of the API, the attributes of each respective virtual computing device may be provided explicitly. That is, the output of the first API function may contain the values of the attributes.

In other implementations, the attributes may be provided indirectly by defining additional requests that discovery application 800 can use to obtain the values of these attributes. For example, when the functions of API server 806 are accessible by way of web queries, each attribute may be specified by a corresponding URL. Discovery application 800 may be able to obtain the value of a respective attribute by transmitting an HTTP request to the corresponding URL. Each URL may, for example, address a corresponding function provided by API server 806 that is configured to identify and provide the attributes of a specific type of computing resource.

Based on or in response to execution of the first API function at block 818, API server 806 may be configured to transmit (e.g., as an HTTP response), to discovery application 800, the output of the first API function, as indicated by arrow 820.

Based on or in response to reception of the output at arrow 820, discovery application 800 may be configured to identify, based on the attributes in the output, load balancers and storage volumes associated with the virtual computing devices, as indicated by block 822. Specifically, discovery application 800 may be configured to identify load balancers that distribute traffic among the virtual computing devices and storage volumes used by the virtual computing devices.

Accordingly, discovery application may be configured to generate one or more additional requests (e.g., HTTP requests) for attributes of the load balancers and the storage volumes, as indicated by block 824. Based on or in response to generating the additional requests at block 824, discovery application 800 may be configured to transmit the additional requests to API server 806, as indicated by arrow 826. Based on or in response to reception of the requests at arrow 826, API server 806 may be configured to execute additional API functions, as indicated by block 828. The additional API functions may be configured to identify and provide the attributes of storage volumes, storage volume endpoints (e.g., endpoints 730, 732, and/or 734), load balancers, load balancer services, load balancer pools, and/or load balancer health services.

Based on or in response to execution of the additional API functions, API server 806 may be configured to transmit, to discovery application, an output of the API functions, as indicated by arrow 830. Based on or in response to reception of the transmission at arrow 830, discovery application 800 may be configured to generate a mapping between the virtual computing devices, the load balancers, and the storage volumes, as indicated by block 832.

Discovery application 800 may be configured to identify a relationship between the load balancers and the virtual computing devices based on the IP addresses assigned to the virtual computing devices, among other identifiers thereof. Specifically, discovery application 800 may be configured to identify load balancers whose pools (e.g., LB pools 736) include therein the IP address or other identifier of at least one of the discovered virtual computing device. Thus, a load balancer may be determined to distribute network traffic to a particular virtual computing device when the IP address or other identifier thereof is found in the LB pool of the load balancer. Through the relationship between the LB pool and the virtual machine, discovery application 800 may also identify how the LB services and LB health services relate to the load balancers and the virtual computing devices.

Discovery application 800 may be configured to identify the storage volumes used by the virtual computing devices based directly on the attributes of the virtual computing devices. That is, the attributes of the virtual computing devices may identify a name, IP address, or other identifier of the storage volumes or storage volume endpoints used by the virtual computing devices. Notably, by causing API server 806 to execute the additional API functions at block 828, discovery application 800 may obtain additional information regarding the storage volumes from API server 806.

Accordingly, discovery application 800 may be configured to parse the output generated by the additional API functions for attributes that indicate relationships with other computing devices. Namely, for each load balancer, discovery application 800 may parse the LB pool thereof to identify IP addresses among which the load balancer distributes network traffic. When an IP in the LB pool matches an IP of one of the discovered virtual computing devices, that virtual computing device may be mapped to the load balancer. This mapping may be indicated directly by a connection between the load balancer and the virtual computing device, or indirectly by a connection between the LB pool of the load balancer and the virtual computing device.

In the case of storage volumes, a relationship between the virtual computing devices and the storage volumes may be indicated by the attributes of the virtual computing device. However, the output received at arrow 830 may provide additional information regarding the storage volumes and the endpoints provided thereby. For example, the attributes of the virtual computing devices may indicate the endpoints used by the virtual computing devices, but not the storage volume itself, or vice versa. The output at arrow 830 may indicate how the endpoints relate to the storage volumes, thus allowing for a more complete representation of the relationships between virtual machines and storage volumes.

Based on or in response to generating the mapping at block 832, discovery application 800 may be configured to request storage of the mapping in CMDB 802, as indicated by arrow 834. Based on or in response to reception of the request at arrow 834, CMDB 802 may be configured to store the mapping, as indicated by block 836. The mapping may be retrievable by other computing devices to allow for visualization of the mapping and thus the service infrastructure provided by remote computing system 804.

In some implementations, discovery application 800 may be configured to discover additional computing resources within remote computing system 804. For example, discovery application 800 may be configured to discover any of the remaining aspects of the model of FIG. 7. Such discovery may be similar to the operations of block 822 through 832. That is, discovery application may, based on the attributes associated with the discovered virtual computing devices, identify other computing resources utilized by the virtual computing devices. Discovery application 800 may then query API functions provided by API server 806 to obtain attributes of these other computing devices, and, based thereon, map these other computing devices to the virtual computing device, the load balancers, and the storage volumes, among other possibilities.

For example, discovery application 800 may be configured to determine, for each geographic region undergoing discovery, two or more availability zones in that region among which the virtual computing devices are distributed. Discovery application 800 may be configured to associate each virtual computing device with its corresponding availability zone and reflect this relationship in the generated mapping. In one example, the attributes of each virtual computing device may directly indicate the availability zone in which the virtual computing device is hosted. Alternatively, discovery application 800 may also identify the subnets assigned to each availability zone. Based on the IP addresses associated with the subnets and the IP addresses assigned to each of the virtual computing devices, each computing device may be related or mapped to a corresponding subnet and thus a corresponding availability zone.

Determining the mapping between availability zones and the virtual computing devices also allows each load balancer to be classified as an in-zone load balancer or a cross-zone load balancer. Namely, a load balancer (e.g., load balancer 620) that is configured to distribute traffic among virtual computing devices that are distributed between two or more availability zones may be considered a cross-zone load balancer. Alternatively, a load balancer (e.g., load balancer 640) that is configured to distribute traffic among virtual computing devices each of which are found in the same availability zone may be considered an in-zone load balancer. Such load balancer classifications and relationships with the availability zones may similarly be mapped and stored in CMDB 802 as configuration items.

Discover application 800 may be configured to update the determined mapping according to a discovery schedule. In one example, discovery application may be configured to periodically (e.g., weekly, daily, every 12 hours, etc.) re-execute the operations of FIG. 8 in order to generate a revised or updated map indicative of any modification taking place since the last mapping.

Additionally or alternatively, discovery application 800 may be configured to re-execute at least a portion of these operations based on notifications received from remote computing system 804. Remote computing system 804 may be configured to transmit, to a URL associated with discovery application 800, notifications of any changes, modifications, or adjustments made of the computing resources therein. Based on such notifications, discovery application 800 may be configured to select and execute a particular discovery pattern (e.g., a subset of the operations discussed above) to obtain updated information regarding the computing resource that has been modified. Discovery application 800 may thus obtain updated attributes that indicate any modifications to the computing resources and reflect such modifications in CMDB 802 by revising the mapping. As a result, discovery application 800 may be able to maintain a near-real-time representation of the computing resources provided by remote computing system 804 and any modifications made thereto.

IX. Example Resource Allocation Management for Remote Computing System

Once a mapping of the computing resources in remote computing system 804 is determined, the mapping may be used to assist with carrying out various other operations in connection with remote computing system 804. For example, based on the number and type of computing resources indicated by the map, discovery application 800 may be configured to determine a cost (e.g., per unit time, total to date, etc.) of provisioning the computing resources indicated by the map. Most notably, however, discovery application may be configured to use this mapping to modify, change, and/or otherwise adjust the discovered computing resources or the attributes thereof. FIGS. 9A, 9B, 9C, and 9D illustrate respective message diagram of operations involved in modifying aspects of remote computing system 804 by way of discovery application 800.

Namely, discovery application 800 may obtain instructions to modify a computing resource of remote computing system 804, as indicated by block 900. In some implementations, the instructions may be user instructions received by way of a graphical user interface provided by discovery application 800. For example, discovery application 800 may display a graphical representation of the mapping determined by way of the operations of FIG. 8. A user may interact with the graphical representation of the mapping (e.g., by clicking, dragging, typing, or otherwise providing input) to add a new computing resource to the mapping, remove a computing resource from the mapping, and/or modify attributes of existing computing resources, among other possibilities. Thus, the graphical user interface may be used to indicate a target state of the mapping requested by the user.

In another example, discovery application 800 may be configured to receive the instructions from a computing device or software application executing within managed network 300. For example, the software application may request additional computing resources or request access to existing computing resources, among other possibilities. In a further example, discovery application 800 may be configured to generate the instructions without external input. For example, discovery application 800 may be configured to maintain the amount of computing resources within a quota or other threshold. The quota or threshold may be selected such that, for example, a cost of the computing resources does not exceed a threshold cost (e.g., cost per unit time, total monthly budget, etc.). Discovery application 800 may additionally or alternatively be configured to request allocation of additional computing resources when utilization of the cloud-based computing environment or portion thereof rises above a first threshold, and/or request termination of some computing resources when the utilization falls below a second threshold. Other reasons for modifying the computing resources are possible.

Based on or in response to obtaining the instructions at block 900, discovery application 800 may be configured to generate a first request to modify the computing resources, as indicated by block 902. In one example, resource server 808 provided by remote computing system 804 may be configured to allow discovery application 800 to remotely modify the computing resources provided by remote computing system 804. Specifically, resource server 808 may be configured to allow desired service infrastructure modifications or states to be specified as programmatic code. For example, resource server 808 may be configured to use an infrastructure-as-code language (e.g., HASHICORP CONFIGURATION LANGUAGE®) and/or an infrastructure-as-code software application (e.g., TERRAFORM®) to specify and execute the desired modifications.

To that end, discovery application 800 may define a plurality of infrastructure-as-code templates, each corresponding to a modification that can be requested by way of discovery application 800. Each template may include one or more objects (e.g., JSON objects) made up of one or more key-value pairs. For example, a template used to deploy a virtual computing device may include a first object having key-value pairs for (i) the type of virtual computing device to be deployed (e.g., processing power, amount of memory, etc.), (ii) a name for the virtual computing device, and (iii) an identifier of the operating system that the virtual computing device is to execute. The keys included in each template may define the information to be provided to remote computing system 804 in order to effectuate a particular modification. At least some of the values in each template may be blank, and may be filled out by discovery application 800 based on the instructions received at block 900.

Based on the instructions obtained at block 900, discovery application 800 may select one or more of these templates to define the desired modification using the infrastructure-as-code language. Discovery application 800 may populate the templates specifying the values for any keys not already associated with a value (and/or overriding the values for some keys). In this way, discovery application 800 may specify the desired modifications by, for example, providing an identifier of the specific computing resource sought to be modified, or indicating a new value to which a particular attributes of a computing resource is to be adjusted, among other possibilities.

In another example, the computing resources of remote computing system 804 may be modifiable by way of a resource management API provided by resource server 808. In such an implementation, generating the first request may include, for example, selecting an API function used to modify the computing resource specified by the instructions at block 900. The first request may thus be an HTTP request that specifies, by way of one or more parameters thereof, the modification indicated by the instructions at block 900.

Based on or in response to generation of the first request at block 902, discovery application 800 may be configured to transmit, to resource server 808, the first request, as indicated by arrow 904. Based on or in response to reception of the first request at arrow 904, resource server 808 may be configured to modify the computing resource specified by the request in the manner defined by the first request, as indicated by block 906.

Based on or in response to modification of the computing resource at block 906, resource server 808 may be configured to transmit, to discovery application 800, a first response indicating the modification, as indicate by arrow 908. The amount of information included in the first response may vary depending on the particular remote computing system. In some cases, the first response may include a confirmation that the modification has been executed, without providing any information regarding the details of the modification. In other cases, the first response may provide data that details the modification. For example, when a new resource is generated, the response may include a name or a unique identifier associated with the new resource. In some cases, the response may also include the values of each of the attributes associated with the new resource. Similarly, when an existing resource is in some way altered (e.g., a value of an attribute thereof is updated), the first response may include an identifier of the resource, the new value of the updated attribute, and/or the values of all attributes.

Based on or in response to reception of the transmission at arrow 908, discovery application 800 may be configured to select a discovery pattern for the modified computing resource, as indicated by block 920. Based on or in response to selection of the discovery pattern at block 910, discovery application 800 may be configured to execute the discovery pattern to verify that the modification executed by resource server 808 matches that of the instructions obtained at block 900, as indicated by block 912.

The selected discovery pattern may include a subset of the operations illustrated in and discussed with respect to FIG. 8. That is, rather than re-discovering and re-mapping all of the computing resources provided by remote computing system 804, the discovery pattern may focus on the computing device that has been modified and/or any computing resources related thereto. The discovery pattern may be configured to discover and obtain the attributes associated with the modified computing resource. Thus, discovery application 800 may use the discovery and mapping process to confirm that the modification to the computing resources has been executed as instructed. The discovery pattern may be used to verify that the computing resource has been created, continues to exist, or has been deleted. The discovery pattern may be additionally or alternatively used to verify that the computing resource has the attributes defined by the instructions at block 900. In short, discovery application 800 may verify that an actual state of the service infrastructure determined by execution of the discovery patterns matches a target state of the service infrastructure specified at block 900.

Based on or in response to execution of the discovery pattern at block 912, discovery application 800 may be configured to transmit, to API server 806, a second request for attributes of the modified computing resource, as indicated by arrow 914. Depending on the specific type of the modified computing resource, the second request may be addressed to a specific API function configured to provide the attributes of that computing resource.

Alternatively or additionally, the second request and/or additional requests may be addressed to functions corresponding to other computing resources that have a relationship with the modified computing resource. For example, when a virtual computing device is modified to (i) stop using a first storage volume and (ii) instead use a second storage volume, an API function associated with storage volumes may be used to obtain the attributes associated with the first and second storage volumes to verify the modification of the virtual computing device.

Based on or in response to reception of the request at arrow 914, API server 806 may be configured to execute an API function addressed by the second request, as indicated by block 916. Based on or in response to execution of the API function, API server 806 may be configured to transmit, to discovery application 800, a second response indicating the output of the API function, as indicated by arrow 918. Based on or in response to reception of the transmission at arrow 918, discovery application 800 may be configured to determine whether the modification executed by resource server 808 at block 906 (and indicated by the second response at arrow 918) matches the instructions received at block 900, as indicated by block 920.

In one example, determining whether the modification matches the instructions may involve generating a preview of an updated mapping of the computing resources. The preview may represent (i) any unchanged portions of the mapping determined at block 832 and (ii) the modification to the computing device executed at block 906. The preview of the mapping may be displayed by way of a user interface along with a prompt asking a user to confirm whether the preview matches the instructions obtained at block 900. When the preview of the mapping matches the user's instructions, the graphical user interface may be used to receive a corresponding confirmation. On the other hand, when preview of the mapping does not match (e.g., is in some way different from) the user's instructions, the graphical user interface may be used to receive an indication to this effect. In some implementations, the user interface may also be used to indicate any differences between the modification and the instructions, thus allowing the erroneous modification to be corrected.

In other examples, discovery application 800 may be configured to automatically determine whether the modification matches the instructions. For example, discovery application may determine that a new computing resource has not been provisioned, a computing resource that was requested to be deleted continues to exist, an attribute requested to be modified remains unchanged, and/or a relationship requested to be formed remains unformed, among other possibilities. Discovery application 800 may, for example, determine a difference between the preview of the mapping and the original mapping to identify any modifications that have actually been performed by resource server 808. Discovery application 800 may then compare these differences with the instructions and determine whether each instruction is associated with a corresponding one of the differences.

Figure 9A:
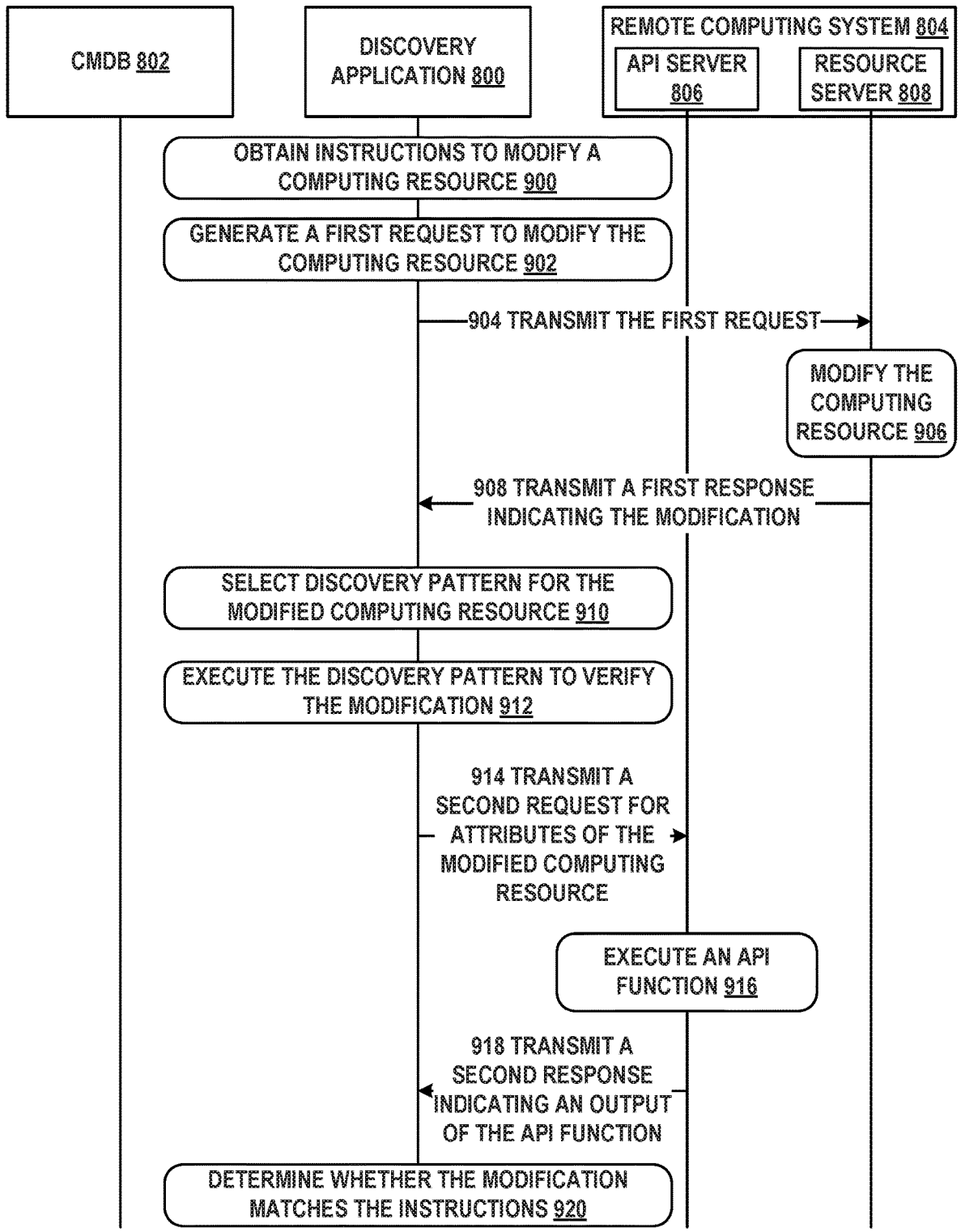
FIGS. 9A, 9B, 9C, and 9D are message diagrams, in accordance with example embodiments.
Figure 9B:
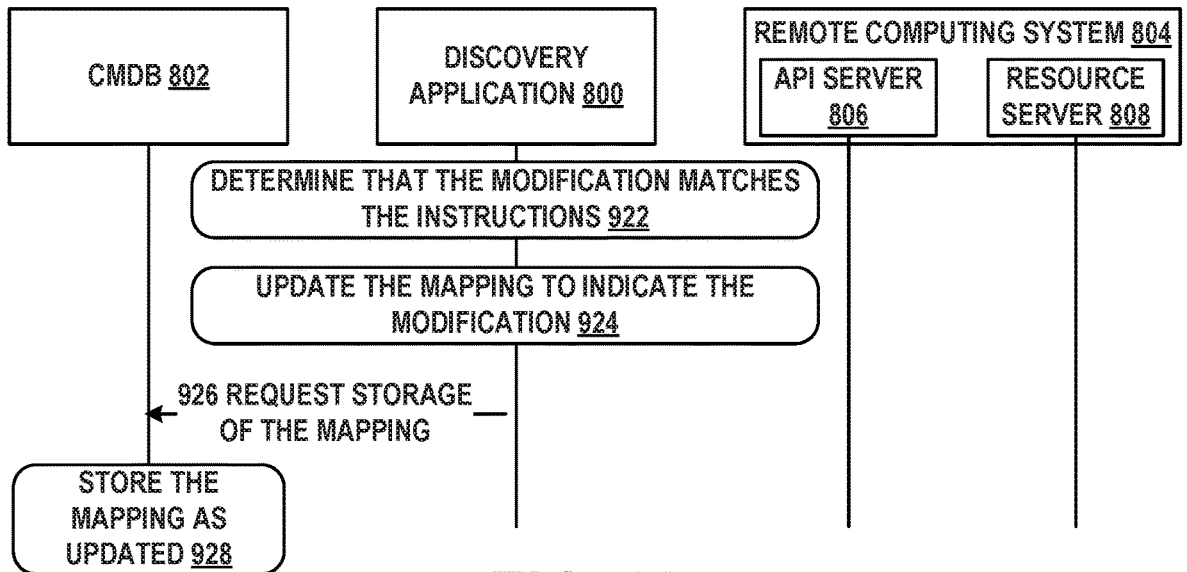

FIG. 9B illustrates example operations that may be carried out by discovery application 800 when the modification to the computing resource matches the instructions. Namely, discovery application 800 may be configured to determine that the modification matches the instructions, as indicated by block 922. Based on or in response to determining that the modification matches the instructions at block 922, discovery application 800 may be configured to update the mapping of the computing resources in remote computing system 804 to indicate the modification, as indicate by block 924.

Based on or in response to updating the mapping at block 924, discovery application 800 may be configured to request storage of the mapping as updated in CMDB 802, as indicated by arrow 926. Based on or in response to reception of the request at arrow 928, CMDB may be configured to store the mapping as updated. Accordingly, a successful modification to the computing resource carried out according to the instructions may be confirmed by being reflected in the mapping and any visual representation thereof.

Figure 9C:
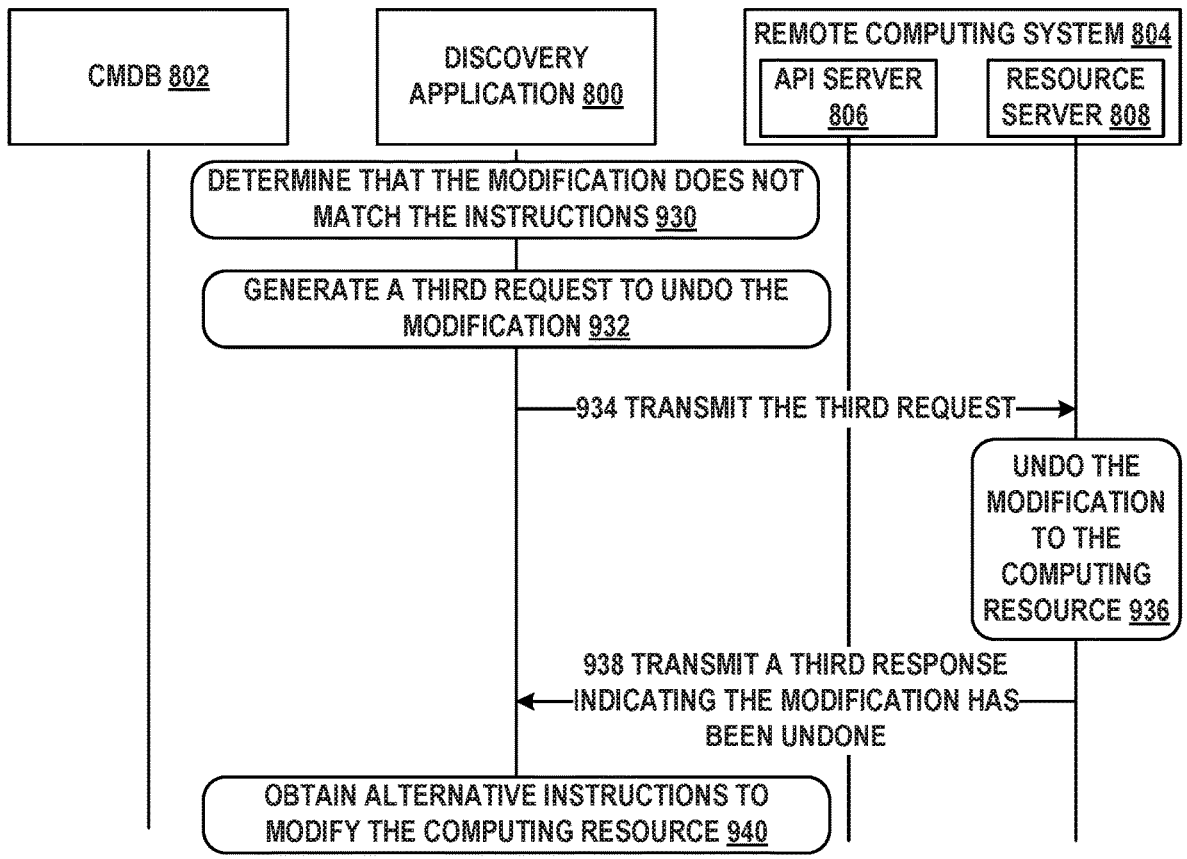
Figure 9D:
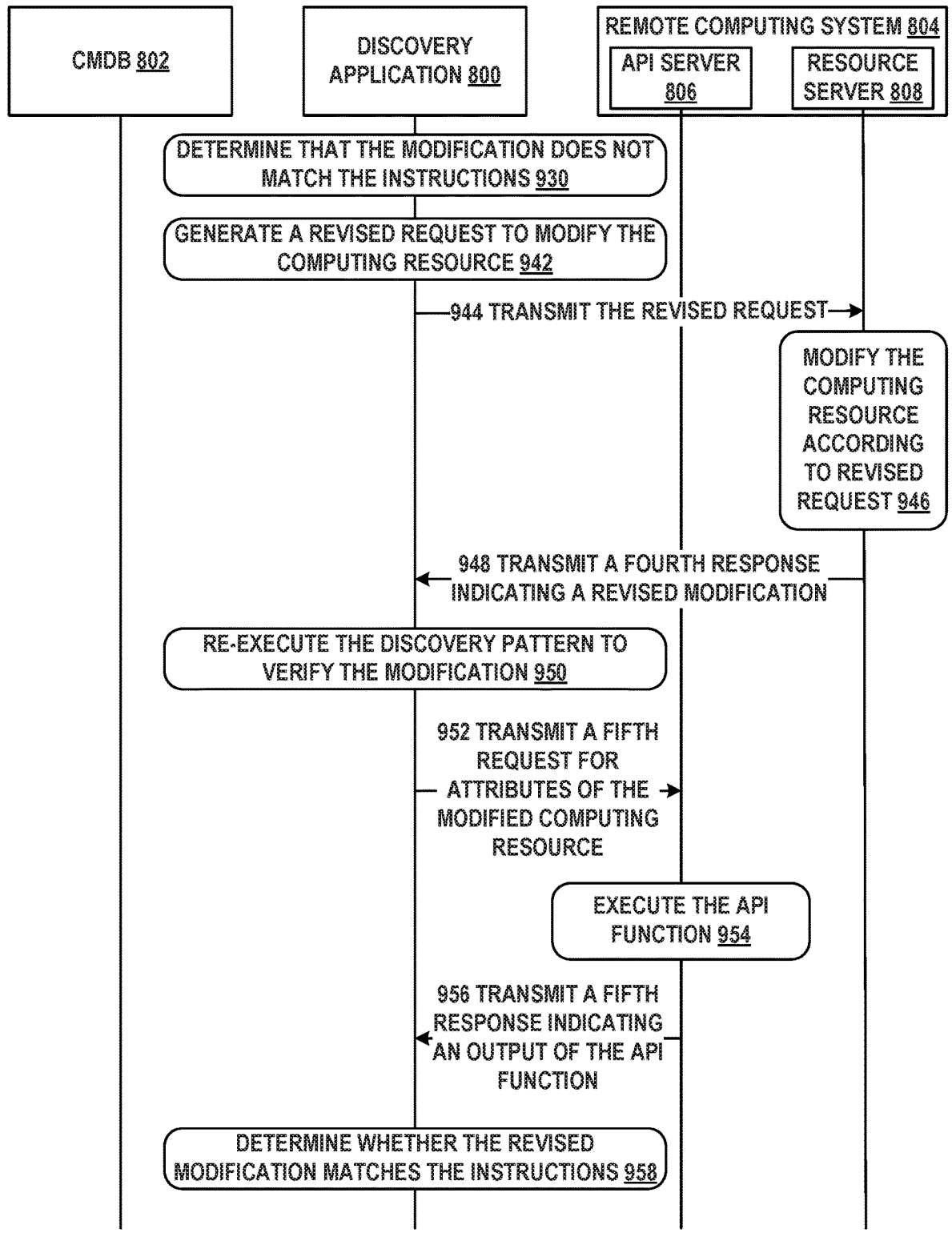

On the other hand, FIGS. 9C and 9D illustrate operations that may be carried out when the modification to the computing device does not match the instructions, as indicated by blocks 930. The modification might not match the instructions when, for example, the instructions contain therein an error. In some cases, the error may be a syntactical error (e.g., when the instructions include incorrectly formatted input) or a typographical error (e.g., when the instructions request that attributes of a virtual computing device that does not exist are modified), among other possible errors. In another example, the modifications might not match the instructions when remote computing system 804 is unable to execute the modification due to one or more rules. The instructions may, for example, request dedication of computing resources that would exceed a quota or other limit (e.g., cost) set by managed network 300 and/or remote computing system 804. Alternatively, the instructions may request modifications of rules (e.g., network security rules, storage volume read/write permissions, etc.) that are not modifiable, for example, due to the requestor (e.g., user or application providing the instructions at block 900) lacking sufficient permissions.

Based on or in response to determining that the modification does not match the instructions at block 930, discovery application 800 may be configured to generate a third request to undo the modification, as illustrated by block 932. For example, the third request may request a modification that is opposite to the modification indicated by the first request at block 902. In some cases, resource server 808 may provide specific functions configured to undo or roll back one or more recent modifications to the service infrastructure. In such cases, the third request may invoke this function and specify the modification to be undone or rolled back.

Based on or in response to generating the third request at block 932, discovery application may be configured to transmit the third request to resource server 808, as indicated by arrow 934. Based on or in response to reception of the request at arrow 934, resource server 808 may be configured to undo the modification to the computing resource, as indicated by block 936. Based on or in response to undoing the modification at block 936, resource server 808 may be configured to transmit, to discovery application 800, a third modification indicating that the modification has been undone, as indicated by arrow 938. The third response may be similar in its content to the first response at arrow 908.

Based on or in response to reception of the third response at arrow 938, discovery application 800 may be configured to obtain alternative instructions to modify the computing resource, as indicated by block 940. The alternative instructions may be a modified version of the instruction obtained at block 900. In some implementations, the alternative instructions may be user instructions obtained by way of the graphical user interface. In other implementations, discovery application 800, or another software application, may be configured to generate the alternative instructions based on any differences between the target service infrastructure state indicated by the instructions at block 900 and the actual service infrastructure state determined at block 920.

Alternatively or additionally, discovery application 800 may be configured to generate a revised request to modify the computing resource, as indicated by block 942 of FIG. 9D. In implementations where the operations of FIG. 9D are carried out after the initial modification is undone according to the operations of FIG. 9C, the revised request may be generated with the assumption that the service infrastructure is in the state it was in prior to execution of block 906. Alternatively, in implementations where the operations of FIG. 9D are carried out without the operations of FIG. 9C, the revised request may be generated with the assumption that the service infrastructure is in the state it was in after execution of block 906. That is, discovery application may take into account the initial incorrect modification when generating the revised request.

Based on or in response to generation of the revised request at block 942, discovery application 800 may be configured to transmit the revised request to resource server 808, as indicated by arrow 944. Based on or in response to reception of the request at arrow 944, resource server 808 may be configured to modify the computing resource according to the revised request, as indicated by block 946. Based on or in response to modification of the computing resource at block 946, resource server 808 may be configured to transmit, to discovery application 800, a fourth response indicating a revised modification to the computing resource, as indicated by arrow 948.

Based on or in response to reception of the transmission at arrow 948, discovery application 800 may be configured to re-execute the discovery pattern to verify the modification to the computing resource, as indicated by block 950. Based on or in response to re-execution of the discovery pattern at block 950, discovery application 800 may be configured to transmit, to API server 806, a fifth request for attributes of the modified computing resource, as indicated by arrow 952. Based on or in response to reception of the transmission at arrow 952, API server 806 may be configured to execute the API function specified by the fifth request, as indicated by block 954. Based on or in response to execution of the API function at block 954, API server 806 may be configured to transmit, to discovery application 800, a fifth response indicating an output of the API function, as indicated by arrow 956.

Based on or in response to reception of the transmission at arrow 956, discovery application 800 may be configured to determine whether the revised modification matches the instructions (e.g., the instructions obtained at block 900 or the alternative instruction of block 940), as indicated by block 958. Notably, the operations of block 942 through block 958 (including the operations of the arrows therebetween), may be analogous to the operations of blocks 902 through 920 of FIG. 9A.

X. Example Operations

Figure 10:
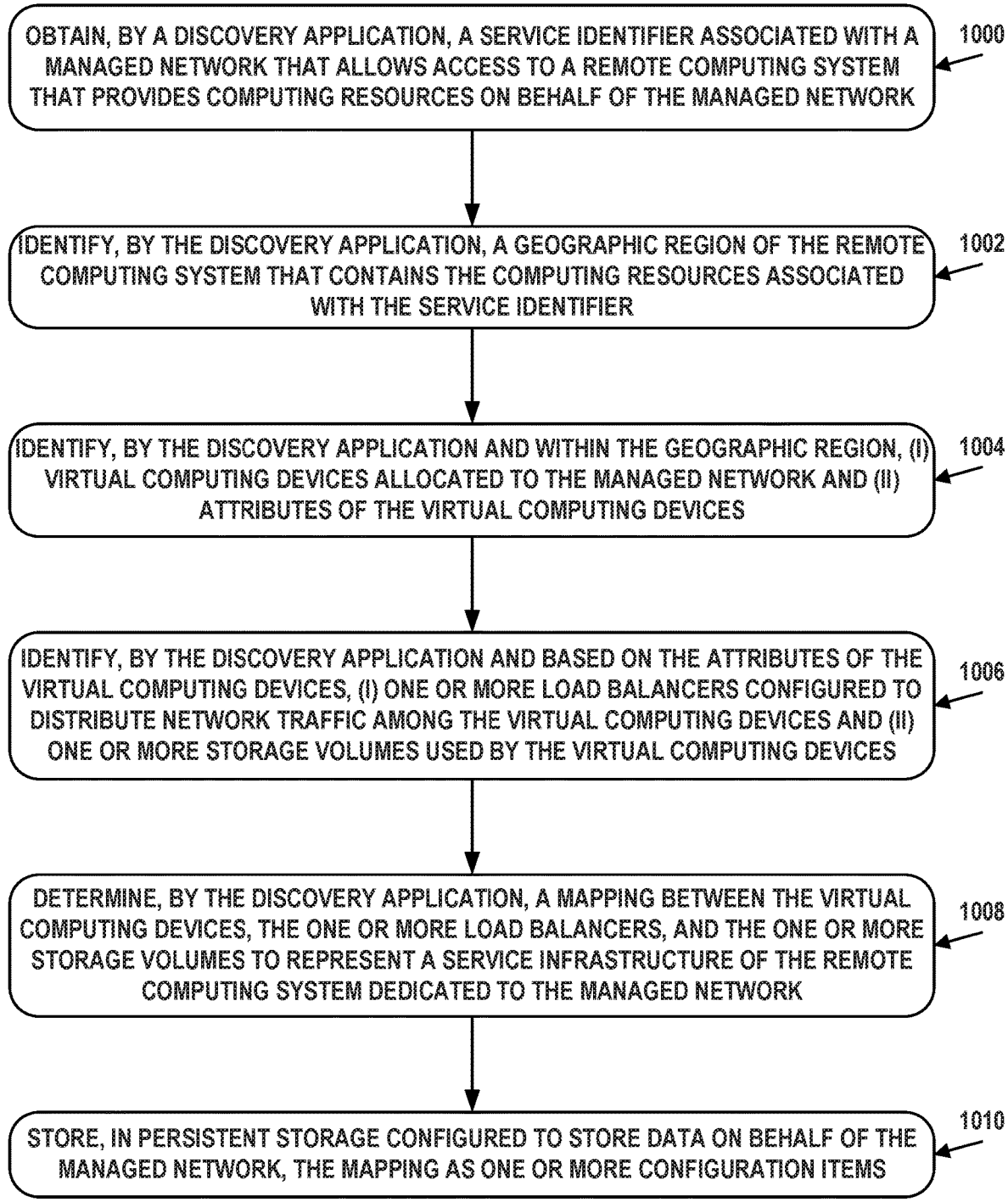
FIG. 10 is a flow chart, in accordance with example embodiments.
Figure 11:
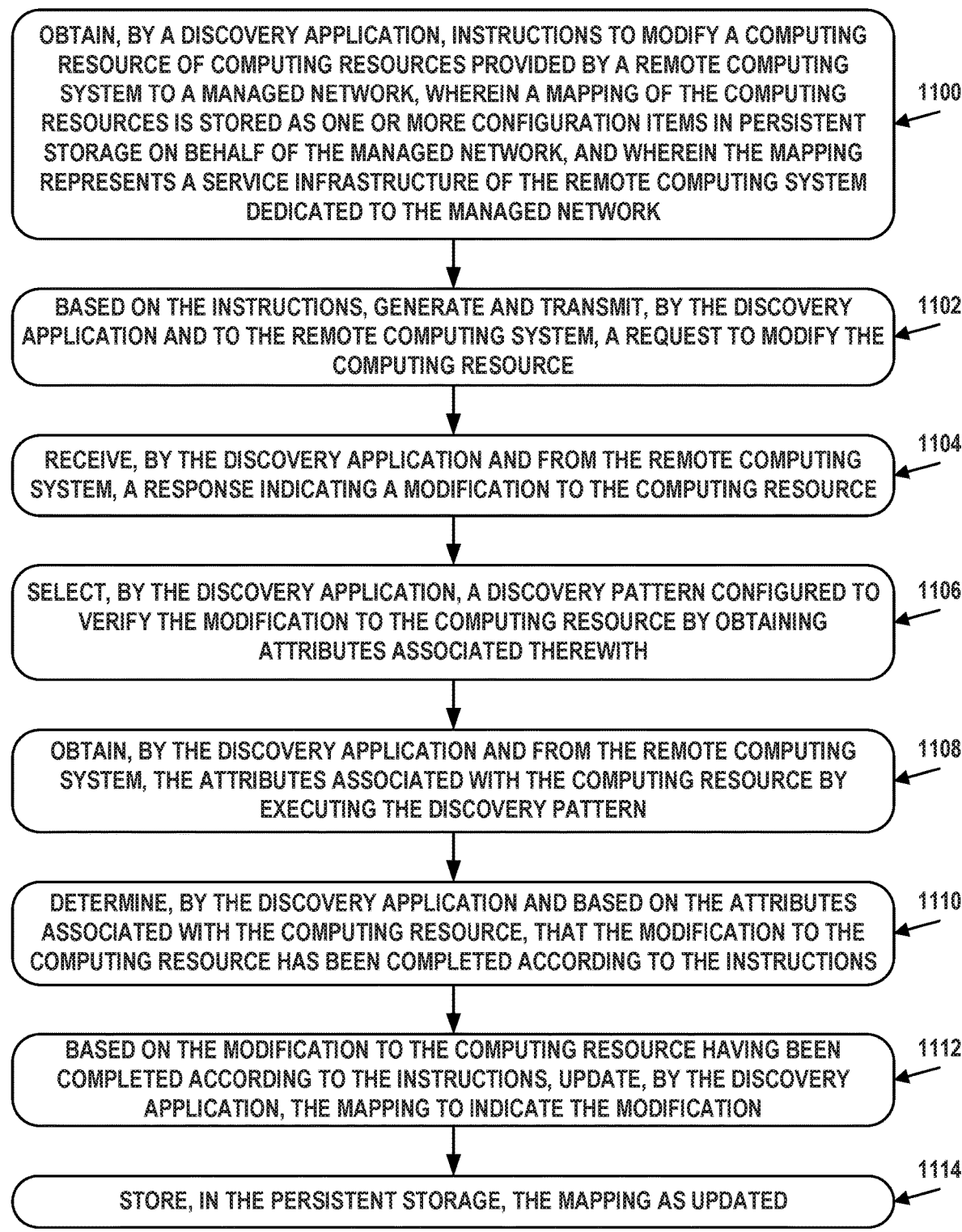
FIG. 11 is a flow chart, in accordance with example embodiments.

FIGS. 10 and 11 are flow charts illustrating example embodiments. The processes illustrated by FIGS. 10 and 11 may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device.

The embodiments of FIGS. 10 and 11 may be simplified by the removal of any one or more of the features shown therein. Aspects of the embodiments of FIGS. 10 and 11 may be combined with one another. Further, these embodiments may be combined with features, aspects, and/or implementations of any of the previous figures or otherwise described herein.

Block 1000 involves obtaining, by a discovery application, a service identifier associated with a managed network that allows access to a remote computing system that provides computing resources on behalf of the managed network.

Block 1002 involves identifying, by the discovery application, a geographic region of the remote computing system that contains the computing resources associated with the service identifier.

Block 1004 involves identifying, by the discovery application and within the geographic region, (i) virtual computing devices allocated to the managed network and (ii) attributes of the virtual computing devices.

Block 1006 involves identifying, by the discovery application and based on the attributes of the virtual computing devices, (i) one or more load balancers configured to distribute network traffic among the virtual computing devices and (ii) one or more storage volumes used by the virtual computing devices.

Block 1008 involves determining, by the discovery application, a mapping between the virtual computing devices, the one or more load balancers, and the one or more storage volumes to represent a service infrastructure of the remote computing system dedicated to the managed network.

Block 1010 involves storing, in persistent storage configured to store data on behalf of the managed network, the mapping as one or more configuration items.

In some embodiments, the discovery application may be configured to identify, within the geographic region, two or more availability zones among which the virtual computing devices are distributed. Each of the two or more availability zones may have a different physical location within the geographic region. The discovery application may also be configured to determine a distribution of the virtual computing devices among the two or more availability zones. The discovery application may additionally be configured to update the mapping to indicate the distribution of the virtual computing devices among the two or more availability zones and store, in the persistent storage, the mapping as updated.

In some embodiments, determining the distribution of the virtual computing devices among the two or more availability zones may involve determining attributes of a network that (i) includes therein the two or more availability zones and (ii) is assigned to the managed network. Based on the attributes of the network and for each respective availability zone of the two or more availability zones, a subnet of the network may be identified that is assigned to the respective availability zone. The distribution may be determined based on (i) the subnet assigned to the respective availability zone and (ii) the attributes of the virtual computing devices.

In some embodiments, identifying the one or more load balancers configured to distribute network traffic among the virtual computing devices may involve identifying a first load balancer of the one or more load balancers that is configured to distribute traffic among a group of two or more of the virtual computing devices. The two or more virtual computing devices of the group may be distributed among multiple availability zones of the two or more availability zones. The mapping between the virtual computing devices and the one or more load balancers may be updated to indicate therein a relationship between the first load balancer and the group. The mapping as updated may be stored in the persistent storage.

In some embodiments, identifying the one or more load balancers configured to distribute network traffic among the virtual computing devices may involve identifying a first load balancer of the one or more load balancers that is configured to distribute traffic among a group of two or more of the virtual computing devices that are each disposed in a single availability zone of the two or more availability zones. The mapping between the virtual computing devices and the one or more load balancers may be updated to indicate therein a relationship between the first load balancer and the group. The mapping as updated may be stored in the persistent storage.

In some embodiments, identifying the virtual computing devices may involve identifying the virtual computing devices across multiple geographic regions. Additionally, identifying the two or more availability zones in the geographic region may involve determining, for each respective virtual computing device of the virtual computing devices and based on the attributes of the respective virtual computing device, a corresponding availability zone within which the respective virtual computing device is hosted. For each respective availability zone of the corresponding availability zones, a corresponding geographic region of the multiple geographic regions to which the respective availability zone belongs may be determined based on a predetermined mapping between the multiple geographic regions and the availability zones.

In some embodiments, identifying the virtual computing devices and the attributes of the virtual computing devices may involve generating and transmitting an HTTP request addressed to a first function of an API provided by the remote computing system. The request may specify the geographic region within which the first function is to identify the virtual computing devices and the attributes thereof. A response may be received from the API that contains (i) an identifier of each respective virtual computing device of the virtual computing devices and (ii) for each respective virtual computing device, the attributes comprising a plurality of URLs. Each respective URL of the plurality of URLs may address a corresponding function of the API configured to identify a specific type of computing resource associated with the respective virtual computing device.

In some embodiments, identifying (i) the one or more load balancers and (ii) the one or more storage volumes may involve selecting, from the plurality of URLs for each respective virtual computing device in the response, at least one URL that addresses a second function of the API configured to identify at least one of (i) the one or more load balancers or (ii) the one or more storage volumes. Based on the at least one URL, a second HTTP request addressed to the second function of the API may be generated and transmitted. A second response containing one or more identifiers of the at least one of (i) the one or more load balancers or (ii) the one or more storage volumes may be received from the API.

In some embodiments, the discovery application may be configured to obtain, from the remote computing system, an indication of costs of provisioning different types of the computing resources. The discovery application may also be configured to, based on (i) the indication of the costs and (ii) the mapping, determining a total cost associated with the computing resources provided on behalf of the managed network.

In some embodiments, identifying the attributes of the virtual computing devices may involve determining, for each respective virtual computing device of the virtual computing devices, attributes of a physical computing device on which the respective virtual computing device is executed.

In some embodiments, the attributes of the virtual computing devices may include identifiers of the one or more storage volumes. Identifying the one or more storage volumes may involve obtaining, from the remote computing system, data that defines attributes of a plurality of storage volumes. Based on the identifiers of the one or more storage volumes, a subset of the data that defines the attributes of the one or more storage volumes may be selected. The mapping may indicate the attributes of the one or more storage volumes.

In some embodiments, the attributes of the virtual computing devices may include IP addresses of the virtual computing devices. Identifying the one or more load balancers may involve obtaining, from the remote computing system, data that identifies a plurality of load balancers within the remote computing system. Based on the data and for each respective load balancer of the plurality of load balancers, a group of IP addresses may be determined among which the respective load balancer is configured to distribute network traffic. For each respective virtual computing device of the virtual computing devices, a corresponding load balancer of the plurality of load balancers may be identified such that the group of IP addresses of the corresponding load balancer includes the IP address of the respective virtual computing device.

In some embodiments, the remote computing system may be configured to transmit, to a URL that addresses the discovery application, notifications of modifications to the computing resources. The discovery application may be configured to receive, from the remote computing system, a notification that a particular computing resource has been modified. In response to receiving the notification, the discovery application may obtain, from the remote computing system, data that identifies a modification to the particular computing resource. The discovery application may also be configured to update the mapping based on the data to indicate the modification to the particular computing resource and store, in the persistent storage, the mapping as updated.

In some embodiments, the modification to the particular computing resource may include at least one of (i) creation of the particular computing resource, (ii) deletion of the particular computing resource, or (iii) modification of one or more attributes of the particular computing resource. The particular computing resource may include at least one of the virtual computing devices, the one or more load balancers, or the one or more storage volumes.

In some embodiments, identifying the one or more storage volumes may involve identifying a plurality of data storage interfaces by way of which the one or more storage volumes are accessible by the virtual computing devices. Determining the mapping between the virtual computing devices and the one or more storage volumes may involve determining, for each respective storage volume of the one or more storage volumes, one or more data storage interfaces by way of which the respective storage volume is accessible by a corresponding virtual computing device of the virtual computing devices.

In some embodiments, the attributes may indicate, for each respective virtual computing device of the virtual computing devices, a corresponding operating system image from which the respective virtual computing device is provisioned. The mapping may indicate the corresponding operating system image for each respective virtual computing device.

In some embodiments, the persistent storage may be disposed within a remote network management platform (e.g., in a computational instance thereof).

Turning now to FIG. 11, block 1100 involves obtaining, by a discovery application, instructions to modify a computing resource of computing resources provided by a remote computing system to a managed network. A mapping of the computing resources may be stored as one or more configuration items in persistent storage on behalf of the managed network. The mapping may represent a service infrastructure of the remote computing system dedicated to the managed network.

Block 1102 involves, based on the instructions, generating and transmitting, by the discovery application and to the remote computing system, a request to modify the computing resource.

Block 1104 involves receiving, by the discovery application and from the remote computing system, a response indicating a modification to the computing resource.

Block 1106 involves selecting, by the discovery application, a discovery pattern configured to verify the modification to the computing resource by obtaining attributes associated therewith.

Block 1108 involves obtaining, by the discovery application and from the remote computing system, the attributes associated with the computing resource by executing the discovery pattern.

Block 1110 involves determining, by the discovery application and based on the attributes associated with the computing resource, that the modification to the computing resource has been completed according to the instructions.

Block 1112 involves, based on the modification to the computing resource having been completed according to the instructions, updating, by the discovery application, the mapping to indicate the modification.

Block 1114 involves storing, in the persistent storage, the mapping as updated.

In some embodiments, the discovery application may also be configured to obtain second instructions to modify a second computing resource provided by the remote computing system and, based on the second instructions, generate and transmit, to the remote computing system, a second request to modify the second computing resource. The discovery application may receive, from the remote computing system, a second response indicating a second modification to the second computing resource and select a second discovery pattern configured to verify the second modification to the second computing resource by obtaining second attributes associated therewith. The discovery application may also obtain, from the remote computing system, the second attributes associated with the second computing resource by executing the second discovery pattern. The discovery application may additionally determine, based on the second attributes associated with the second computing resource, that the second modification to the second computing resource has not been completed according to the second instructions.

In some embodiments, the discovery application may be configured to, based on the second modification to the second computing resource not having been completed according to the second instructions (i) generate and transmit, to the remote computing system, a third request to modify the second computing resource, where the third request is a revised version of the second request, (ii) receive, from the remote computing system, a third response indicating a third modification to the second computing resource, (iii) obtain, from the remote computing system and by re-executing the second discovery pattern, updated second attributes associated with the second computing resource, (iv) determine, based on the updated second attributes, that the third modification to the second computing resource has been completed according to the second instructions, and (v) based on the third modification to the computing resource having been completed according to the second instructions, update the mapping to indicate the third modification and store, in the persistent storage, the second mapping as updated.

In some embodiments, the discovery application may, based on the second modification to the second computing resource not having been completed according to the second instructions, (i) generate and transmit, to the remote computing system, a third request to undo the second modification to the second computing resource, and (ii) verify that the second modification has been undone by re-executing the second discovery pattern.

In some embodiments, obtaining the instructions to modify the computing resource may involve displaying, by way of a graphical user interface, a graphical representation of the mapping and receiving, by way of the graphical user interface, input indicating a target state of the graphical representation to be achieved by the modification. Based on the input, the discovery application may determine (i) the computing resource to modify and (ii) a manner in which the computing resource is to be modified to achieve the target state of the graphical representation.

In some embodiments, generating the request to modify the computing resource may involve selecting, from a plurality of templates that define, as programmatic code, a plurality of candidate modifications to the computing resources provided to the managed network, a particular template that defines the modification to the computing resource indicated by the instructions. The particular template may be populated according to the instructions.

In some embodiments, generating the request to modify the computing resource may involve generating an HTTP request addressed to a function of an API provided by the remote computing system. The function of the API may be configured to manage the computing resources provided to the managed network. The request may specify the computing resource and the modification thereto as one or more HTTP parameters.

In some embodiments, the HTTP parameters may include at least one of: (i) a URL resource path parameter that identifies a specific resource provided by a server device that hosts the API, (ii) a URL query parameter comprising a key and value pair, (iii) an HTTP header parameter, (iv) an HTTP cookie parameter, or (v) an HTTP body parameter.

In some embodiments, the computing resource may be a virtual computing device. The modification to the virtual computing device may include at least one of: (i) provisioning of the virtual computing device, (ii) deprovisioning of the virtual computing device, (iii) suspending operation of the virtual computing device, (iv) changing an amount of processor resources available to the virtual computing device, or (v) changing an amount of memory available to the virtual computing device.

In some embodiments, the computing resource may be a storage volume. The modification to the storage volume may include at least one of: (i) provisioning of the storage volume, (ii) deprovisioning of the storage volume, (iii) creating a snapshot of the storage volume, (iv) restoring the storage volume from a snapshot, or (v) changing a size of the storage volume.

In some embodiments, selecting the discovery pattern may involve determining a type of the computing resource based on at least one of: (i) the instructions, (ii) the request, or (iii) the response. The discovery pattern may be selected that is configured to obtain attributes associated with the type of the computing resource.

In some embodiments, the instructions to modify the computing resource may indicate one or more target relationships between the computing resource and one or more other computing resources provided to the managed network by the remote computing system. Determining that the modification to the computing resource has been completed according to the instructions may involve determining, based on the attributes associated with the computing resource, one or more actual relationships between the computing resource and the one or more other computing resources and determining that the one or more actual relationships match the one or more target relationships.

In some embodiments, the instructions to modify the computing resource may indicate one or more target relationships between the computing resource and one or more other computing resources provided to the managed network by the remote computing system. Selecting the discovery pattern may involve selecting, for each respective computing resource of the one or more other computing resources, a corresponding discovery pattern configured to obtain additional attributes associated with the respective computing resource. The discovery application may obtain, from the remote computing system and for each respective computing resource, the additional attributes associated with the respective computing resource by executing the corresponding discovery pattern.

In some embodiments, determining that the modification to the computing resource has been completed according to the instructions may involve determining, based on the additional attributes associated with each respective computing resource of the one or more other computing resources, one or more actual relationships between the computing resource and the one or more other computing resources and determining that the one or more actual relationships match the one or more target relationships.

In some embodiments, determining that the modification to the computing resource has been completed according to the instructions may involve generating a preview of the mapping as updated to indicate the modification, displaying, by way of a graphical user interface, the preview of the mapping as updated, and receiving, by way of the graphical user interface, input indicating that the preview of the mapping represents the modification as indicated by the instructions.

XI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
persistent storage configured to store data on behalf of a managed network, wherein a remote computing system provides computing resources on behalf of the managed network; and
a discovery application configured to perform operations comprising:
obtaining a service identifier that allows access to the remote computing system, wherein the service identifier is associated with the managed network;
identifying a geographic region of the remote computing system that contains the computing resources associated with the service identifier;
identifying, within the geographic region, (i) virtual computing devices allocated to the managed network and (ii) attributes of the virtual computing devices;
identifying, based on the attributes of the virtual computing devices, (i) one or more load balancers configured to distribute network traffic among the virtual computing devices and (ii) one or more storage volumes used by the virtual computing devices;
determining a mapping between the virtual computing devices, the one or more load balancers, and the one or more storage volumes to represent a service infrastructure of the remote computing system dedicated to the managed network; and
storing, in the persistent storage, the mapping as one or more configuration items.

2. The system of claim 1, wherein the operations further comprise:
identifying, within the geographic region, two or more availability zones among which the virtual computing devices are distributed, wherein each of the two or more availability zones comprises a different physical location within the geographic region;
determining a distribution of the virtual computing devices among the two or more availability zones;
updating the mapping to indicate the distribution of the virtual computing devices among the two or more availability zones; and
storing, in the persistent storage, the mapping as updated.

3. The system of claim 2, wherein determining the distribution of the virtual computing devices among the two or more availability zones comprises:
determining attributes of a network that (i) includes therein the two or more availability zones and (ii) is assigned to the managed network;
based on the attributes of the network, identifying, for each respective availability zone of the two or more availability zones, a subnet of the network assigned to the respective availability zone; and
based on (i) the subnet assigned to the respective availability zone and (ii) the attributes of the virtual computing devices, determining the distribution.

4. The system of claim 2, wherein identifying the one or more load balancers configured to distribute network traffic among the virtual computing devices comprises:
identifying a first load balancer of the one or more load balancers that is configured to distribute traffic among a group of two or more of the virtual computing devices that are distributed among multiple availability zones of the two or more availability zones;
updating the mapping between the virtual computing devices and the one or more load balancers to indicate therein a relationship between the first load balancer and the group; and
storing, in the persistent storage, the mapping as updated.

5. The system of claim 2, wherein identifying the one or more load balancers configured to distribute network traffic among the virtual computing devices comprises:
identifying a first load balancer of the one or more load balancers that is configured to distribute traffic among a group of two or more of the virtual computing devices that are each disposed in a single availability zone of the two or more availability zones;
updating the mapping between the virtual computing devices and the one or more load balancers to indicate therein a relationship between the first load balancer and the group; and
storing, in the persistent storage, the mapping as updated.

6. The system of claim 2, wherein identifying the virtual computing devices comprises identifying the virtual computing devices across multiple geographic regions, wherein identifying the two or more availability zones in the geographic region comprises:
determining, for each respective virtual computing device of the virtual computing devices and based on the attributes of the respective virtual computing device, a corresponding availability zone within which the respective virtual computing device is hosted; and
for each respective availability zone of the corresponding availability zones, determining a corresponding geographic region of the multiple geographic regions to which the respective availability zone belongs based on a predetermined mapping between the multiple geographic regions and the availability zones.

7. The system of claim 1, wherein identifying the virtual computing devices and the attributes of the virtual computing devices comprises:
generating and transmitting a hypertext transfer protocol (HTTP) request addressed to a first function of an application programming interface (API) provided by the remote computing system, wherein the request specifies the geographic region within which the first function is to identify the virtual computing devices and the attributes thereof; and
receiving, from the API, a response containing (i) an identifier of each respective virtual computing device of the virtual computing devices and (ii) for each respective virtual computing device, the attributes comprising a plurality of uniform resource locators (URLs), wherein each respective URL of the plurality of URLs addresses a corresponding function of the API configured to identify a specific type of computing resource associated with the respective virtual computing device.

8. The system of claim 7, wherein identifying (i) the one or more load balancers and (ii) the one or more storage volumes comprises:
selecting, from the plurality of URLs for each respective virtual computing device in the response, at least one URL that addresses a second function of the API configured to identify at least one of (i) the one or more load balancers or (ii) the one or more storage volumes;
based on the at least one URL, generating and transmitting a second HTTP request addressed to the second function of the API; and
receiving, from the API, a second response containing one or more identifiers of the at least one of (i) the one or more load balancers or (ii) the one or more storage volumes.

9. The system of claim 1, further comprising:
obtaining, from the remote computing system, an indication of costs of provisioning different types of the computing resources; and
based on (i) the indication of the costs and (ii) the mapping, determining a total cost associated with the computing resources provided on behalf of the managed network.

10. The system of claim 1, wherein identifying the attributes of the virtual computing devices comprises:
determining, for each respective virtual computing device of the virtual computing devices, attributes of a physical computing device on which the respective virtual computing device is executed.

11. The system of claim 1, wherein the attributes of the virtual computing devices comprise identifiers of the one or more storage volumes, and wherein identifying the one or more storage volumes comprises:
obtaining, from the remote computing system, data that defines attributes of a plurality of storage volumes; and
selecting, based on the identifiers of the one or more storage volumes, a subset of the data that defines the attributes of the one or more storage volumes, wherein the mapping indicates the attributes of the one or more storage volumes.

12. The system of claim 1, wherein the attributes of the virtual computing devices comprise internet protocol (IP) addresses of the virtual computing devices, and wherein identifying the one or more load balancers comprises:
obtaining, from the remote computing system, data that identifies a plurality of load balancers within the remote computing system;
determining, based on the data and for each respective load balancer of the plurality of load balancers, a group of IP addresses among which the respective load balancer is configured to distribute network traffic; and
for each respective virtual computing device of the virtual computing devices, identifying a corresponding load balancer of the plurality of load balancers, wherein the group of IP addresses of the corresponding load balancer includes the IP address of the respective virtual computing device.

13. The system of claim 1, wherein the remote computing system is configured to transmit, to a uniform resource locator (URL) that addresses the discovery application, notifications of modifications to the computing resources, wherein the operations further comprise:
receiving, from the remote computing system, a notification that a particular computing resource has been modified;
in response to receiving the notification, obtaining, from the remote computing system, data that identifies a modification to the particular computing resource;
updating the mapping based on the data to indicate the modification to the particular computing resource; and
storing, in the persistent storage, the mapping as updated.

14. The system of claim 13, wherein the modification to the particular computing resource comprises at least one of (i) creation of the particular computing resource, (ii) deletion of the particular computing resource, or (iii) modification of one or more attributes of the particular computing resource, and wherein the particular computing resource comprises at least one of the virtual computing devices, the one or more load balancers, or the one or more storage volumes.

15. The system of claim 1, wherein identifying the one or more storage volumes comprises identifying a plurality of data storage interfaces by way of which the one or more storage volumes are accessible by the virtual computing devices, and wherein determining the mapping between the virtual computing devices and the one or more storage volumes comprises determining, for each respective storage volume of the one or more storage volumes, one or more data storage interfaces by way of which the respective storage volume is accessible by a corresponding virtual computing device of the virtual computing devices.

16. The system of claim 1, wherein the attributes indicate, for each respective virtual computing device of the virtual computing devices, a corresponding operating system image from which the respective virtual computing device is provisioned, and wherein the mapping indicates the corresponding operating system image for each respective virtual computing device.

17. A computer-implemented method comprising:
obtaining, by a discovery application, a service identifier associated with a managed network that allows access to a remote computing system that provides computing resources on behalf of the managed network;
identifying, by the discovery application, a geographic region of the remote computing system that contains the computing resources associated with the service identifier;
identifying, by the discovery application and within the geographic region, (i) virtual computing devices allocated to the managed network and (ii) attributes of the virtual computing devices;
identifying, by the discovery application and based on the attributes of the virtual computing devices, (i) one or more load balancers configured to distribute network traffic among the virtual computing devices and (ii) one or more storage volumes used by the virtual computing devices;

determining, by the discovery application, a mapping between the virtual computing devices, the one or more load balancers, and the one or more storage volumes to represent a service infrastructure of the remote computing system dedicated to the managed network; and storing, in persistent storage configured to store data on behalf of the managed network, the mapping as one or more configuration items.

18. The computer-implemented method of claim 17, further comprising:

identifying, within the geographic region, two or more availability zones among which the virtual computing devices are distributed, wherein each of the two or more availability zones comprises a different physical location within the geographic region;

determining a distribution of the virtual computing devices among the two or more availability zones;

updating the mapping to indicate the distribution of the virtual computing devices among the two or more availability zones; and storing, in the persistent storage, the mapping as updated.

19. The computer-implemented method of claim 18, wherein determining the distribution of the virtual computing devices among the two or more availability zones comprises:

determining attributes of a network that (i) includes therein the two or more availability zones and (ii) is assigned to the managed network;

based on the attributes of the network, identifying, for each respective availability zone of the two or more availability zones, a subnet of the network assigned to the respective availability zone; and based on (i) the subnet assigned to the respective availability zone and (ii) the attributes of the virtual computing devices, determining the distribution.

20. An article of manufacture including a non-transitory computer-readable medium, having stored thereon program instructions that, upon execution by a computing system, cause the computing system to perform operations comprising:

obtaining a service identifier associated with a managed network that allows access to a remote computing system that provides computing resources on behalf of the managed network;

identifying a geographic region of the remote computing system that contains the computing resources associated with the service identifier;

identifying, within the geographic region, (i) virtual computing devices allocated to the managed network and (ii) attributes of the virtual computing devices;

identifying, based on the attributes of the virtual computing devices, (i) one or more load balancers configured to distribute network traffic among the virtual computing devices and (ii) one or more storage volumes used by the virtual computing devices;

determining a mapping between the virtual computing devices, the one or more load balancers, and the one or more storage volumes to represent a service infrastructure of the remote computing system dedicated to the managed network; and storing, in persistent storage configured to store data on behalf of the managed network, the mapping as one or more configuration items.

* * * * *